May 24, 1960  E. A. WILCKENS ET AL  2,937,404
LIQUID PLASTIC LINING MACHINE
Filed Aug. 26, 1955  15 Sheets-Sheet 8
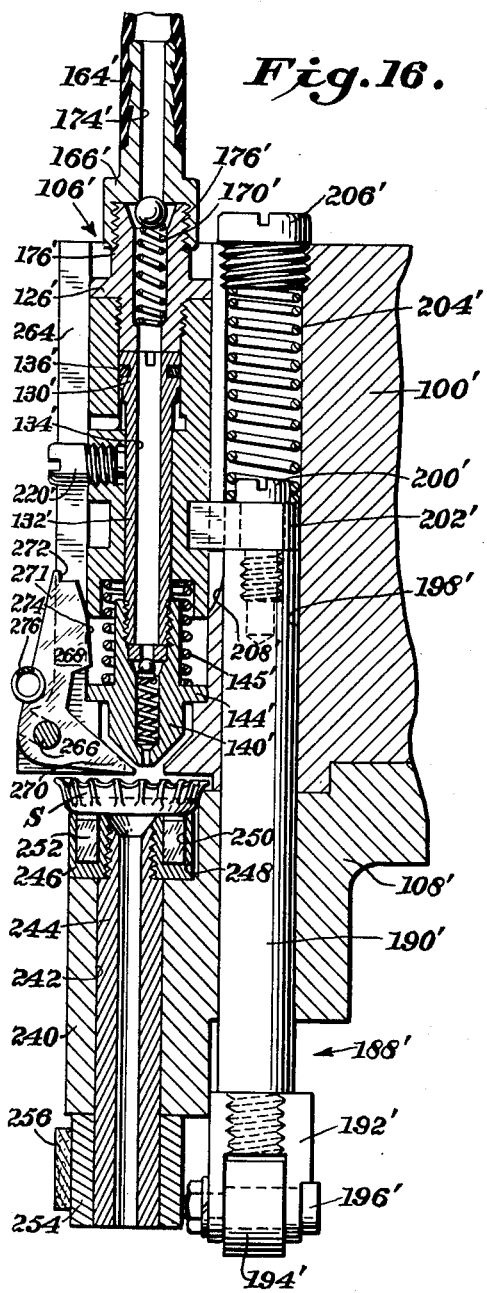
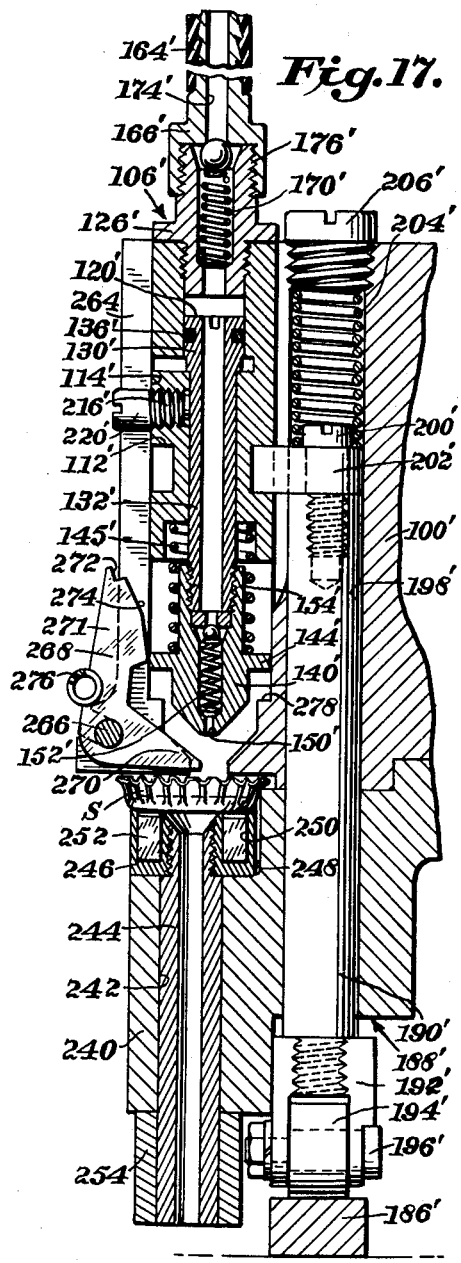
INVENTORS:
Eibe A. Wilckens,
William C. Rainer,
Joseph G. Germak,
James P. Hamilton,
BY Edward M. Redding,
Cushman, Darby & Cushman
ATTORNEYS.

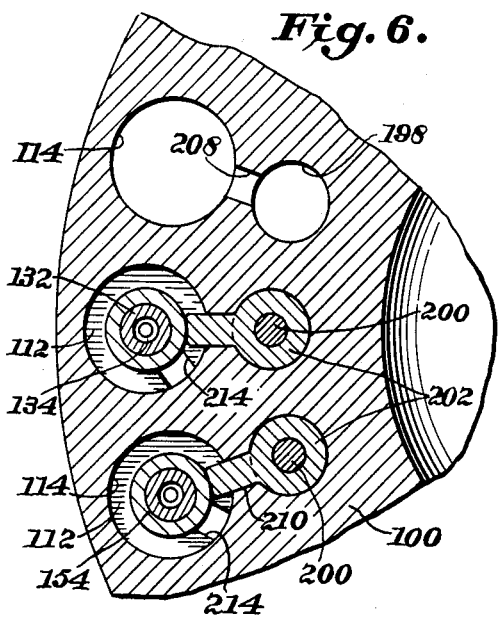
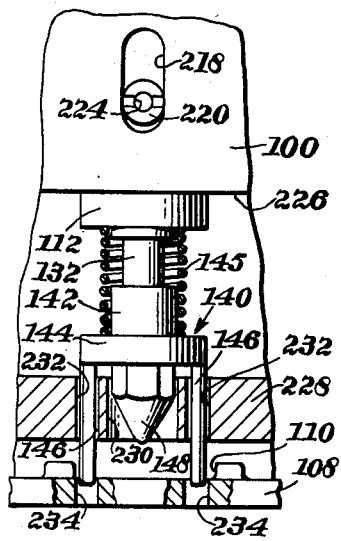
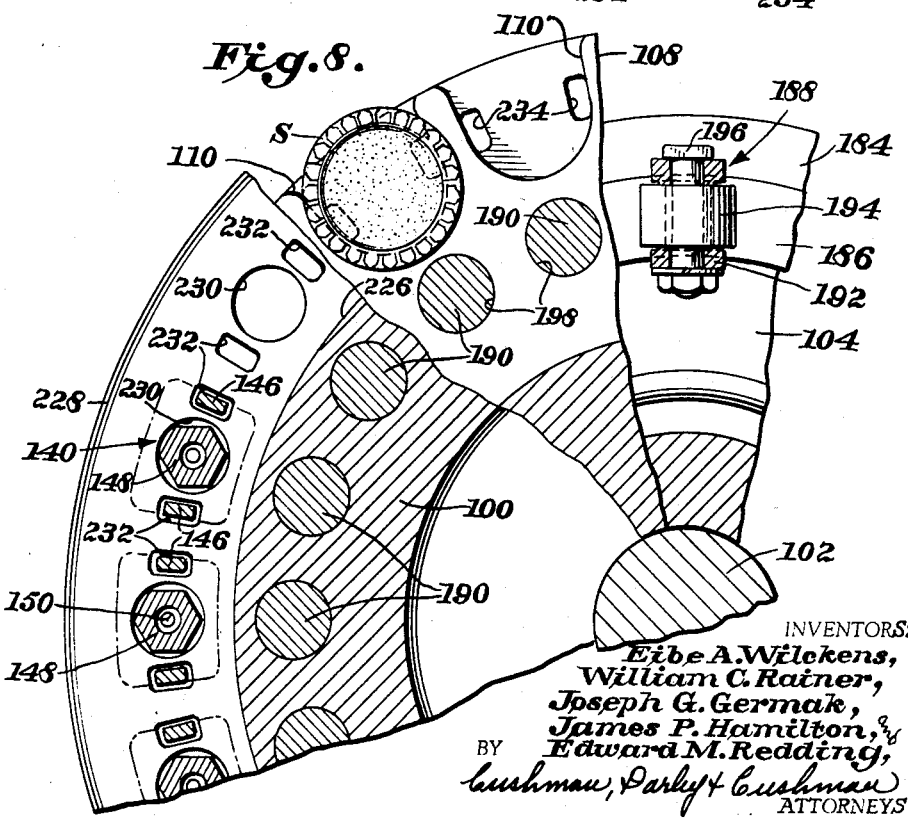

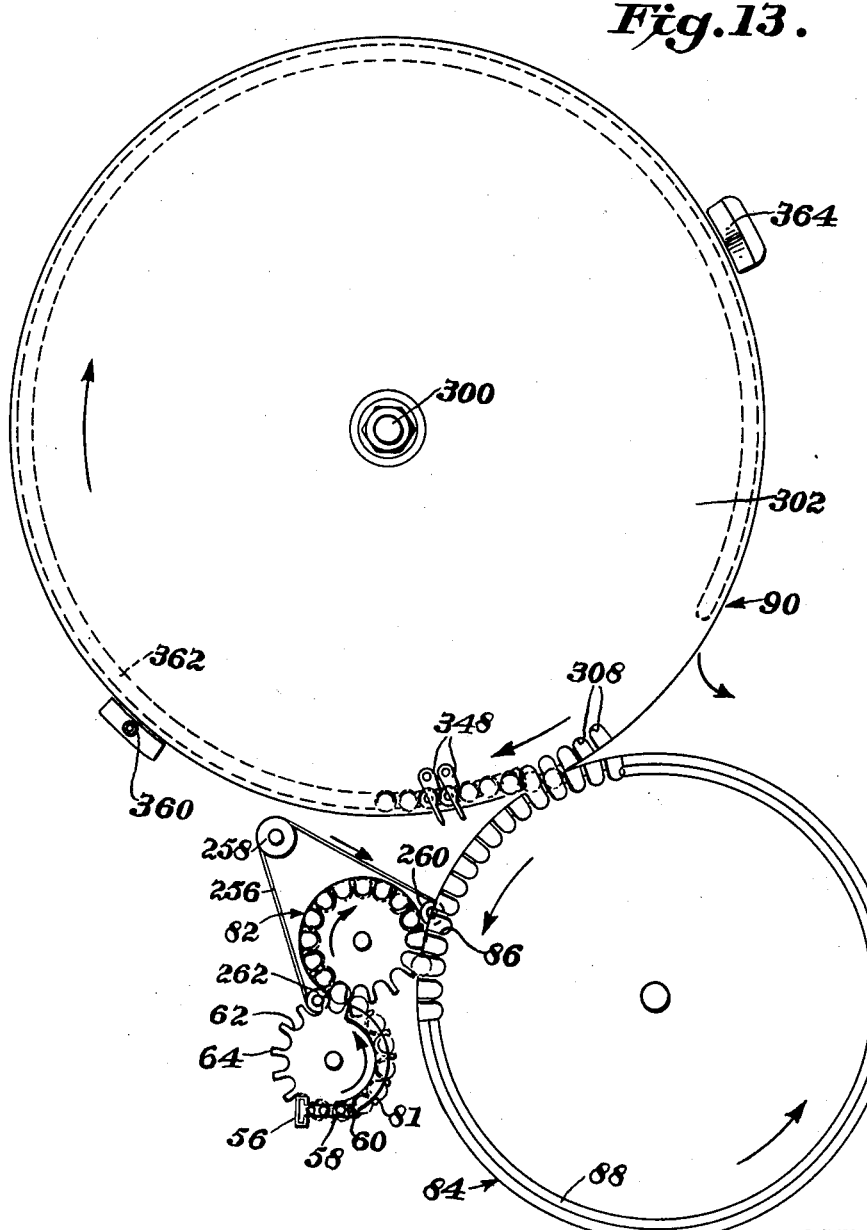

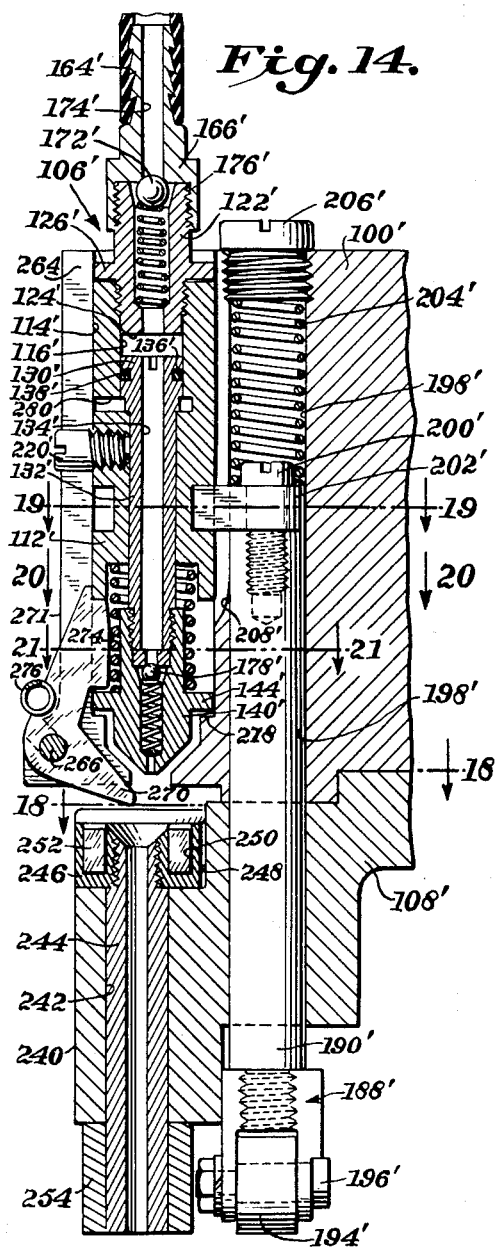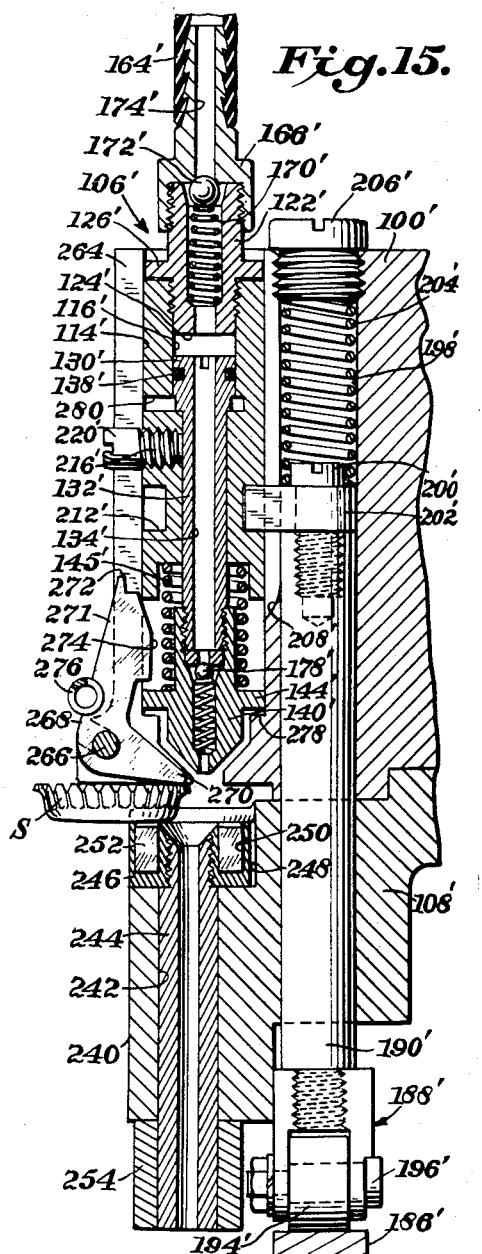

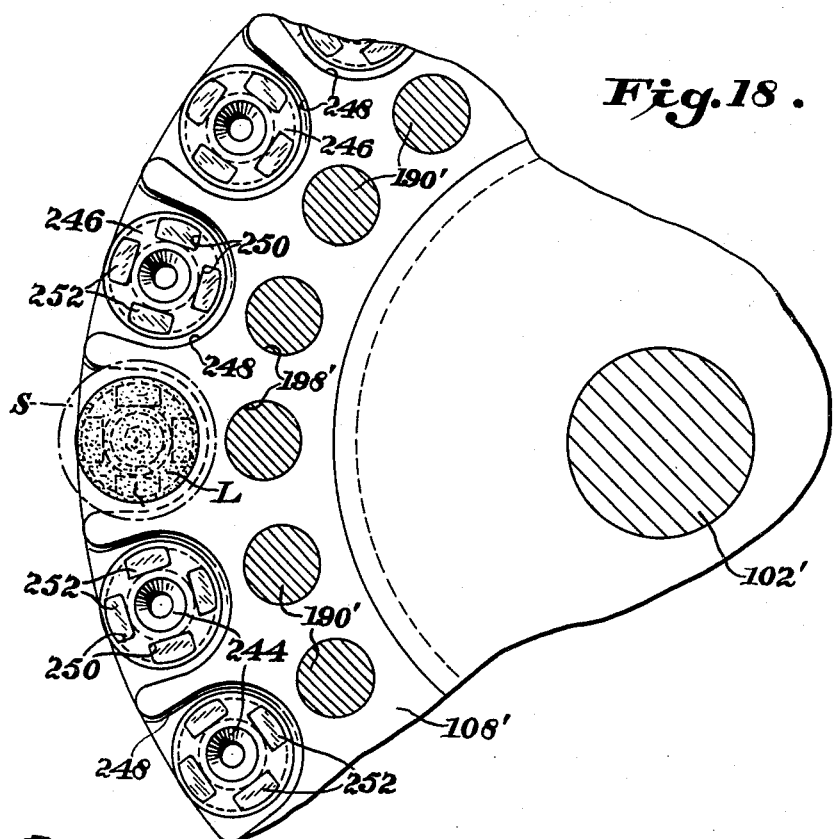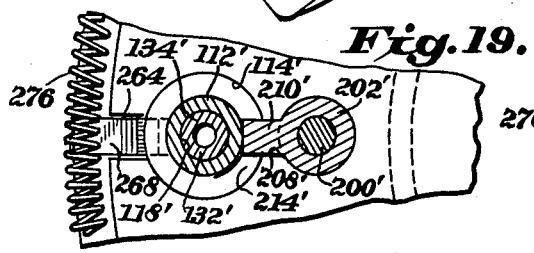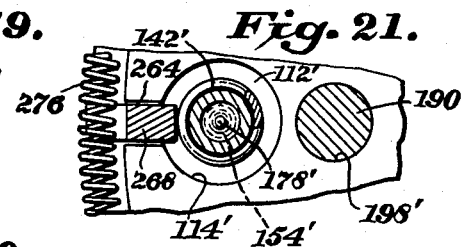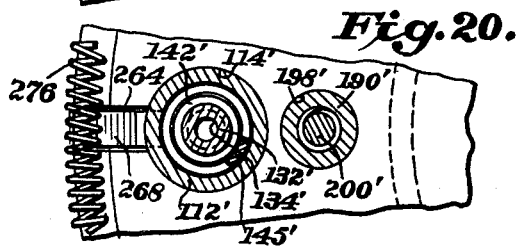

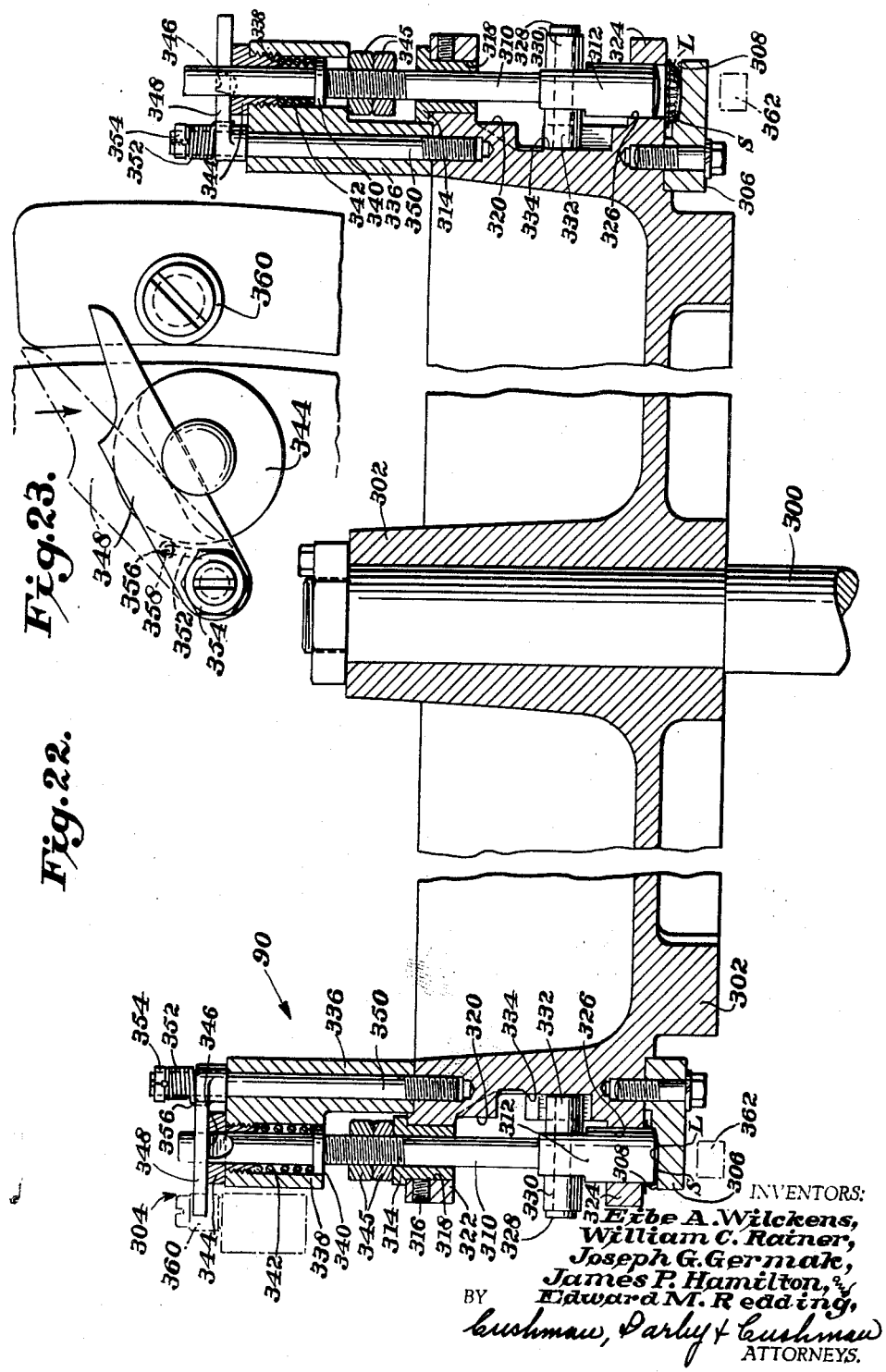

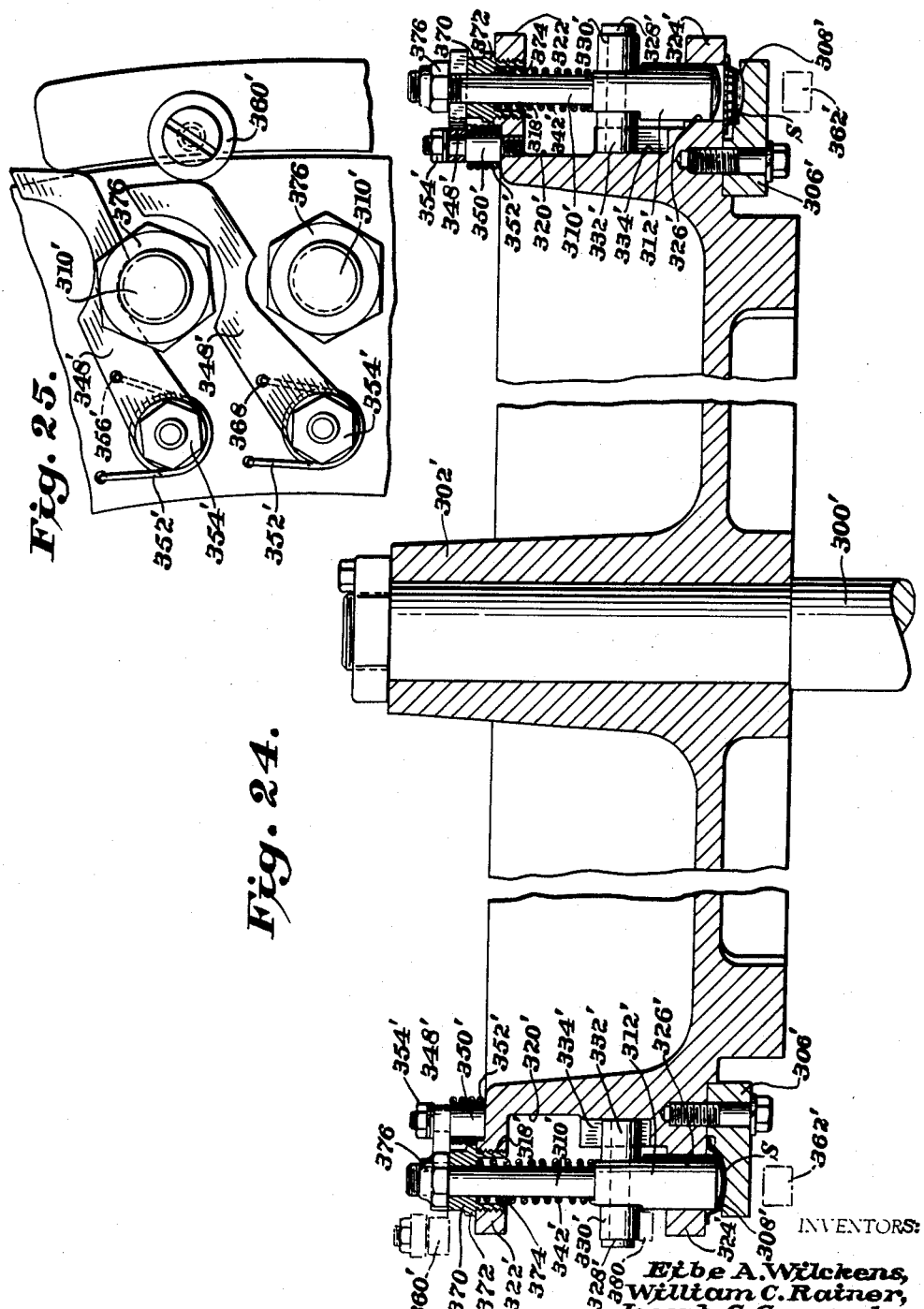

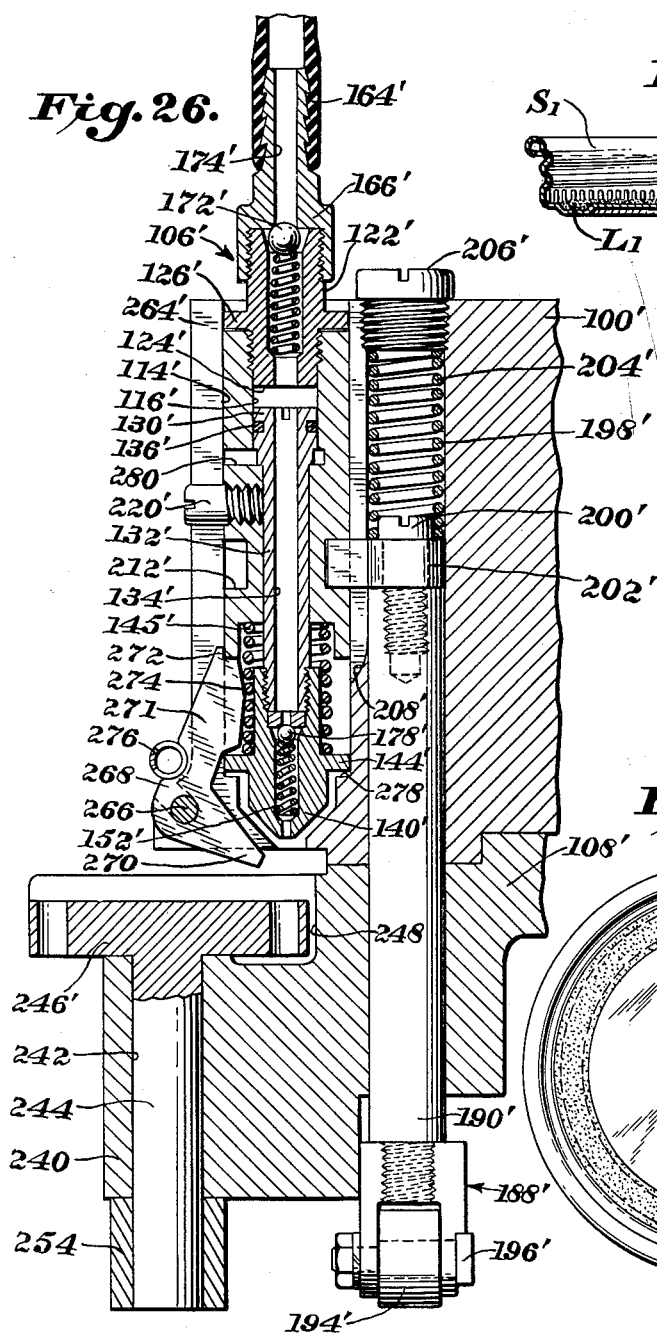
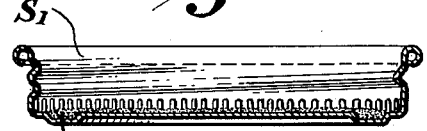
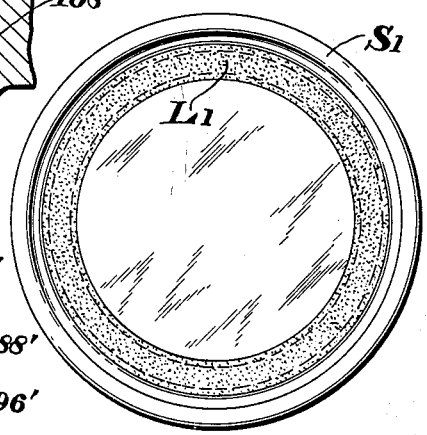

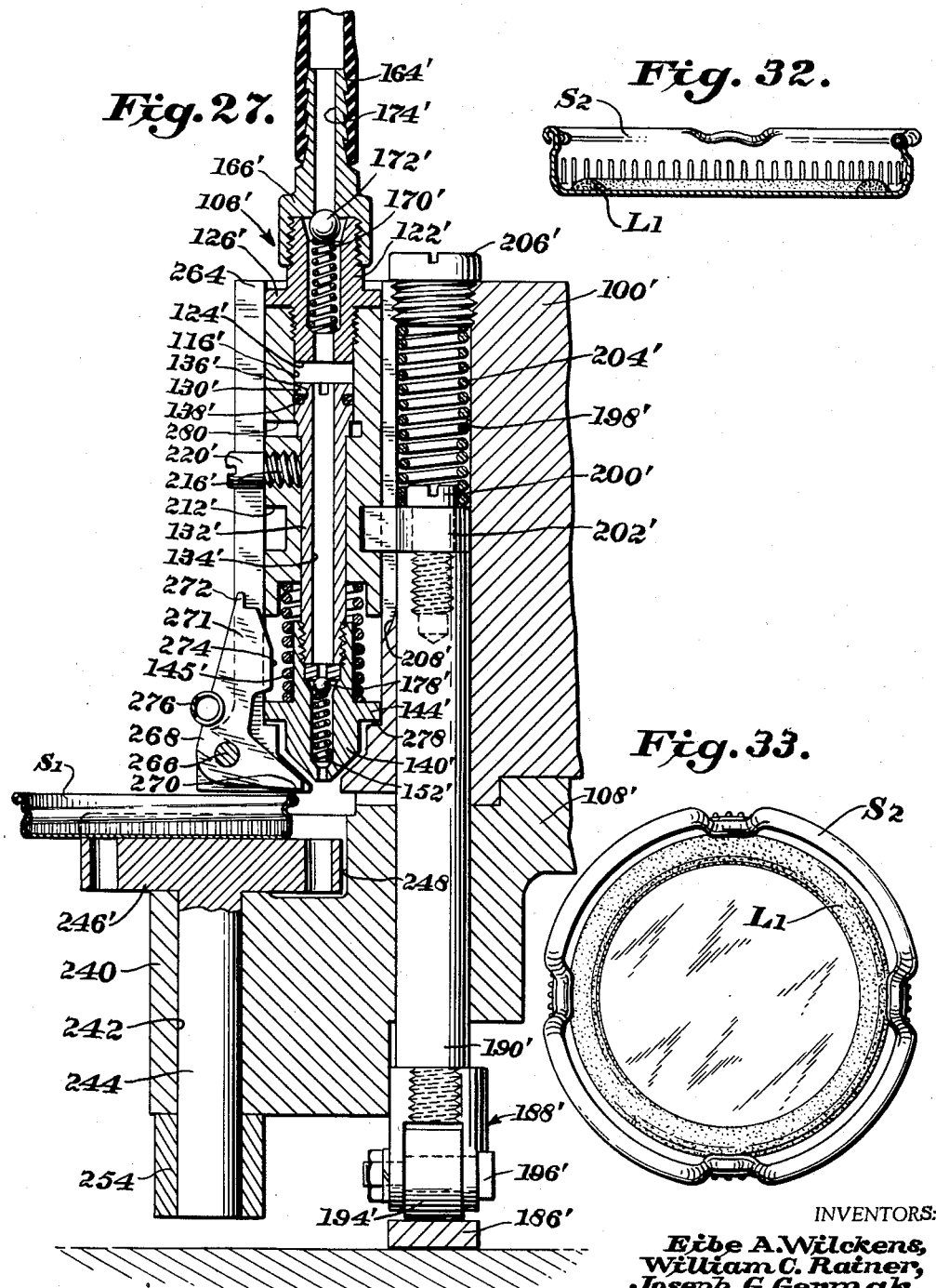

May 24, 1960 E. A. WILCKENS ET AL 2,937,404
LIQUID PLASTIC LINING MACHINE
Filed Aug. 26, 1955 15 Sheets-Sheet 14

INVENTORS.
Eibe A. Wilckens,
William C. Rainer,
Joseph G. Germak,
James P. Hamilton,
Edward M. Redding,
BY Cushman, Darby & Cushman
ATTORNEYS.

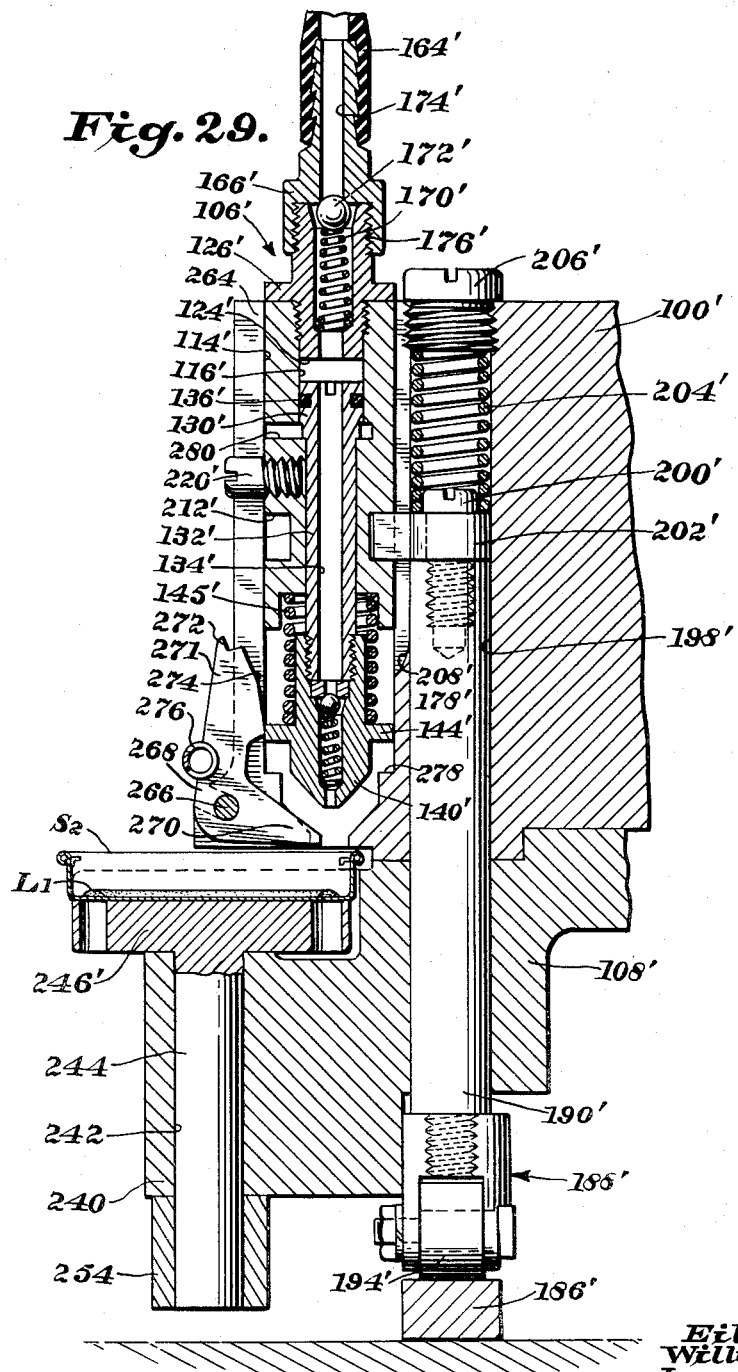

United States Patent Office 2,937,404
Patented May 24, 1960

2,937,404
LIQUID PLASTIC LINING MACHINE

Eibe A. Wilckens, William C. Rainer, and Joseph G. Germak, Baltimore, and James P. Hamilton, Glen Burnie, and Edward M. Redding, Baltimore, Md., assignors to Crown Cork & Seal Company, Inc., Baltimore, Md., a corporation of New York Filed Aug. 26, 1955, Ser. No. 530,819

14 Claims. (Cl. 18—20)

This invention relates to the art of lining closures and more particularly to improved closure lining methods, and machines for lining bottle crowns and caps in accordance therewith and in accordance with the methods disclosed in the copending Rainer et al. application, Serial No. 478,986, filed December 31, 1954, and other similar methods. This application constitutes a continuation-in-part of our copending application, Serial No. 497,722, filed March 29, 1955.

One object of the present invention is to provide a machine for lining a cap with a cushion liner of a plastic material of the type mentioned in the above-identified application, which is continuous in its operation thereby obtaining optimum output.

A still further object of the present invention is the provision of a method and machine for heating successive empty closures, for depositing a measured charge of a viscous plastic into the preheated closures, for preheating the plastic charge to cure at least a hardened or tackfree film on the surface thereof, and for molding the plastic charge under heat and pressure to form a finished molded and cured liner in the closure.

A further object of the present invention is the provision of a novel procedure and mechanism for distributing the charge within the closure so that the same will contact the interior of the shell throughout substantially the entire surface area to which the liner is to be applied.

A further object of the present invention is the provision of a plastic charge feeding mechanism which is adapted to deposit a measured charge of a plastisol in a viscous state into successive closures.

A still further object of the present invention is the provision of a plastic charge depositing mechanism of the type described which is provided with means operable to permit the depositing of a charge only when a closure is presented to receive the charge.

Still another object of the present invention is the provision of a high speed machine which is operable to produce a high output of finished closures substantially all of which contain a liner accurately formed therein, thereby reducing the inspection needed.

A still further object of the invention is the provision of a high speed machine operable to deposit a measured charge of a viscous plastic into successive empty closures, to preheat the plastic in the closures so as to cure a hardened or non-tacky film on the exposed surface thereof, and to mold the preheated plastic in the shells to a desired shape under heat and pressure.

Another object of the present invention is the provision of a machine for applying liners of a plastic sealing material to the interior of closures which secures a stronger bond between the liner and closure and which insures that the sealing material will be spread throughout the interior of the closure so that a perfect mold can be obtained.

These and other objects of the present invention will become more apparent during the course of the following detailed description and appended claims.

The invention may best be understood with reference to the accompanying drawings wherein illustrative embodiments are shown.

In the drawings:

Figure 6 is a cross-sectional view taken along the line 6—6 of Figure 5;

Figure 7 is a fragmentary view similar to Figure 4 showing the device in another operative position;

Figure 8 is a three level cross-sectional view taken at taken at levels A, B and C of Figure 5;

Figure 9 is a front elevational view of a part of the charge depositing device;

Figure 10 is a bottom view of the part shown in Figure 9;

Figure 11 is a detailed side elevational view of another part of the charge depositing device;

Figure 12 is a top plan view of the part shown in Figure 11;

Figure 13 is a somewhat schematic top plan view of a machine embodying a modified form of the invention;

Figure 14 is a fragmentary vertical sectional view of one of the charge depositing devices of the modified form of the invention showing the same in a position of operation preparatory to receiving a closure shell;

Figure 15 is a view similar to Figure 14 showing the device in another position of operation as the shell is transferred thereto;

Figure 16 is a view similar to Figure 14 showing a still further position of operation where the charge is ejected into the shell;

Figure 17 is a view similar to Figure 14 showing the device in a still further position of operation where the charged shell is ready for transfer therefrom;

Figure 18 is a cross-sectional view taken along the line 18—18 of Figure 14;

Figure 19 is a cross-sectional view taken along the line 19—19 of Figure 14;

Figure 20 is a cross-sectional view taken along the line 20—20 of Figure 14;

Figure 21 is a cross-sectional view taken along the line 21—21 of Figure 14;

Figure 22 is a vertical cross-sectional view of the molding dial of the modified form of the invention;

Figure 23 is an enlarged fragmentary top plan view showing certain details of construction of the molding dial;

Figure 24 is a view similar to Figure 22 showing a still further modified form of the molding dial;

Figure 25 is a view similar to Figure 23 of the modified molding dial;

Figure 26 is a view similar to Figure 14 showing a modification of the charge depositing dial mechanism which is adapted to be used for lining caps of the lugs or screw type;

Figure 27 is a view similar to Figure 15 of the mechanism shown in Figure 26;

Figure 29 is a view similar to Figure 17 of the mechanism of Figure 26;

Figure 30 is a side elevational view, partly broken away, of a screw type cap having a charge of plastisol deposited therein;

Figure 31 is a top plan view of the cap of Figure 30;

Figure 32 is a vertical sectional view of a lug type cap having a charge of plastisol deposited therein; and Figure 33 is a top plan view of the cap shown in Figure 32.

*General construction and operation*

Figure 1:
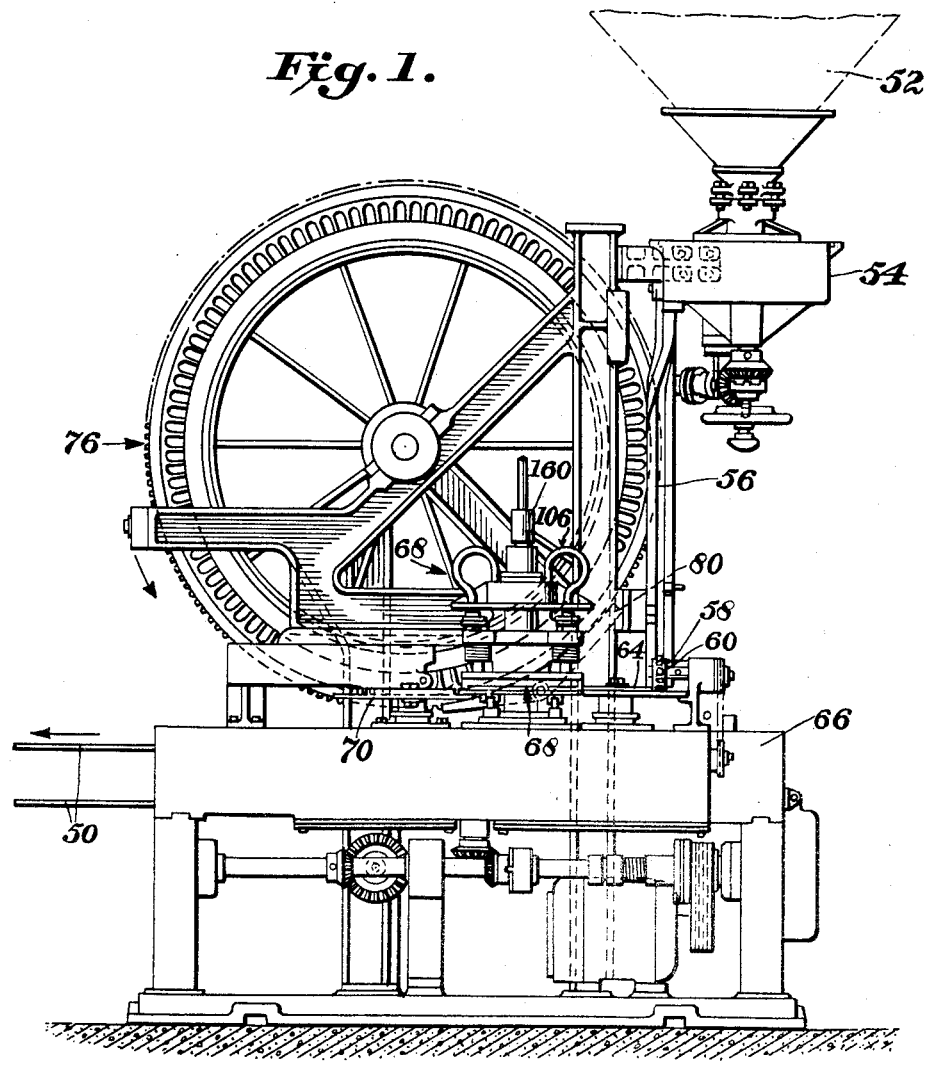
Figure 1 is a side elevational view of a cap lining machine embodying one form of the present invention.

The machine illustrated in the drawings is intended to form liners in crown-type bottle caps which comprise a metal shell S having a fluted skirt and a molded and cured liner L of plastisol of the type disclosed in the aforesaid application. As disclosed in the application, one method of forming the lined caps includes the steps of depositing a measured charge of uncured plastisol into an empty shell S, preheating the charge in the shell until a relatively hard or non-tacky film is cured on the exposed surface thereof, and then molding the film containing plastisol in the metal shell S under suitable heat and pressure to form a finished molded and cured liner L therein. In a preferred embodiment, the shell S is preheated before receiving the charge and then rotated about its own axis with the charge deposited therein so as to insure that the charge will be distributed uniformly around the entire interior of the shell and flow into engagement with the fluted skirt thereof.

In the embodiment disclosed in Figures 1-12, the present invention incorporates the general arrangement of the machine disclosed in Wilckens and Rau Patent No. 2,703,130, issued March 1, 1955. While this machine is for assembling cork liners in shells to form caps, the drive mechanism, the shell feeding mechanism and presser dial mechanism may be utilized with only slight modifications. The liner feeding dial and associated mechanism, assembly dial mechanism and transfer dial mechanism of the Wilckens and Rau machine are either dispensed with entirely or replaced by a different mechanism.

Figure 2:
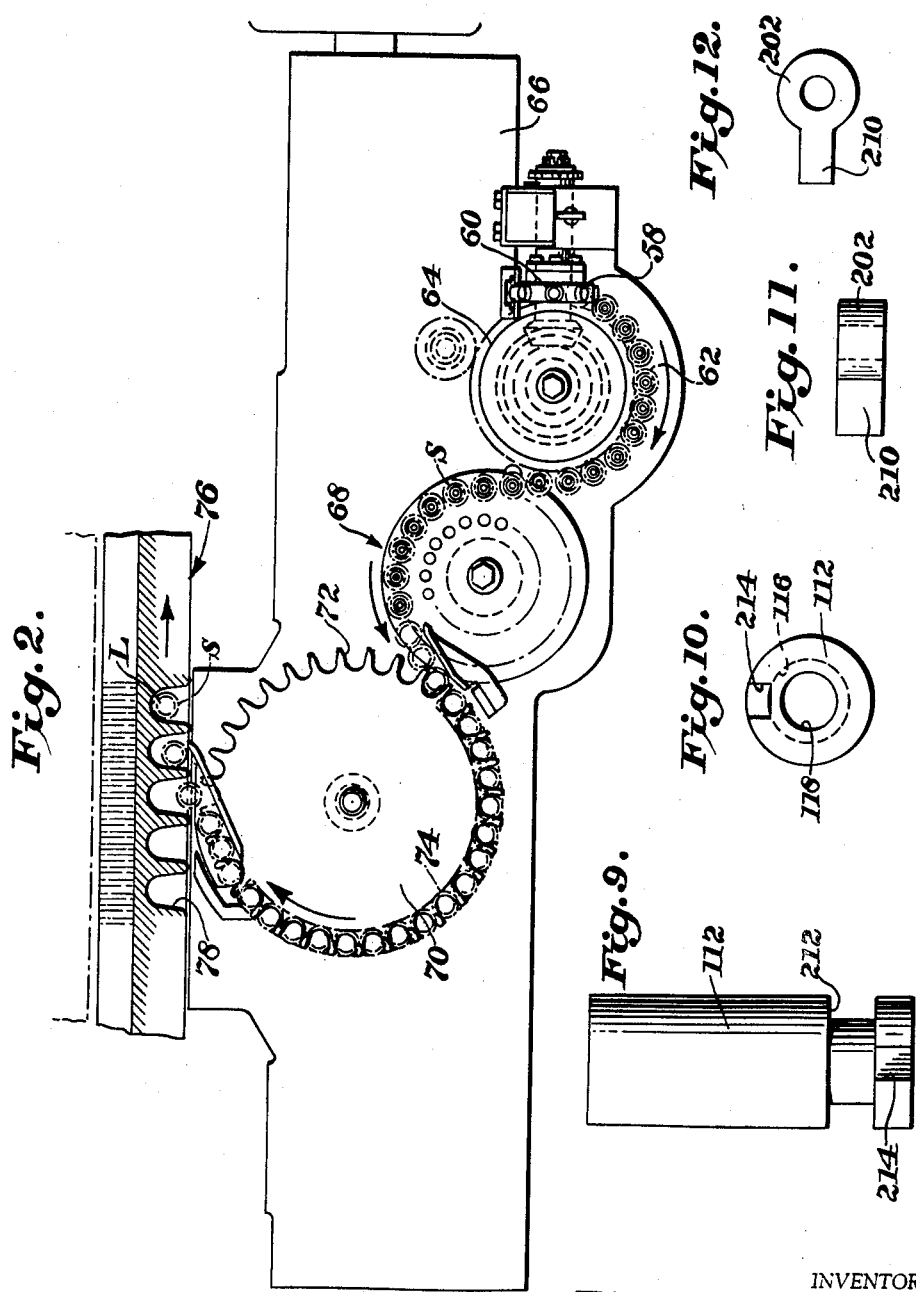
Figure 2 is a plan view of the machine shown in Figure 1 with certain parts removed and various elements shown in horizontal section for the purpose of clear illustration.

Referring now to Figures 1 and 2 of the drawings, two machines such as disclosed herein are usually arranged side by side so that the caps produced thereby can be delivered to a single outlet conveyor 50 extending between a pair of machines and moving toward the left in Figure 1. The two machines are identical except for such changes that enable them to face in opposite directions and, therefore, only the left hand machine of Figure 2 is hereinafter described.

The shells S are delivered to the machine from a source including the chute outlet 52 shown in the upper portion of Figure 1, the shells falling from the chute 52 into the shell feeding mechanism 54. The shells move downwardly from feeding mechanism 54 in single file by way of a chute 56. Chute 56 includes a rectifier and delivers properly facing shells to a shell delivery wheel 58 provided with a series of circumferentially spaced pads 60 which engage the shells S to withdraw them from the lower and curved bottom end of chute 56. The shell delivery wheel 58 positions the shells in successive pockets 62 of a shell feeding dial 64 mounted for rotation in a horizontal plane above the table 66 of the machine.

The shell feeding dial 64 delivers the successive shells to a charge depositing dial mechanism, generally indicated at 68, where a measured charge of the lining or sealing material, in the form of a plastisol in a viscous state, is deposited into each successive shell S as it is carried by the dial mechanism 68. The charge depositing dial mechanism includes means operable to permit the depositing of a charge only when a shell S is presented to receive the charge.

The shells, with a measured charge of plastisol deposited therein, are transferred from the charge depositing dial mechanism 68 onto a conditioning dial 70 mounted for rotation in a horizontal plane above the table 66 and having a plurality of circumferentially spaced seats or pockets 72 for receiving and supporting successive closures.

The term "conditioning," as herein used, denotes a preheating treatment in which the plastisol is at least partially advanced toward the transition temperature of cure in graduated intensity extending downwardly from the exposed heating surface thereof to the point of shell contact. The conditioning dial is provided with a heating element 74, preferably in the form of an electrical radiant heater disposed above the seats 72 in the path of travel thereof. The heating element 74 applies an elevated temperature to the plastisol charge in the successive closures during their movement on the conditioning dial sufficient to at least form a substantially hardened or non-tacky film on the surface thereof. As set forth in the Rainer et al. application, the duration and temperature of the heat applied to the plastisol while the closures are on the conditioning dial may be varied, so as to substantially fully cure the entire plastisol charge. Heat may also be applied from a heating element located below the line of closures in dial 70, if full cure is desired.

The shells S with a surface or fully cured plastisol charge therein are then transferred from the conditioning dial onto a molding dial, generally indicated at 76, of the type disclosed in John D. Elder, Patent No. 2,242,621, issued February 21, 1944, as indicated in the aforesaid Wilckens and Rau patent. In brief, the molding dial is mounted for rotation in a vertical plane, and as disclosed in the Elder patent, includes cam control spring-pressed plungers (not shown) which exert a molding pressure on the liner material in the shells S during the final curing of the same. The spring-pressed plungers extend radially and are spaced annularly around the molding dial. A plurality of circumferentially spaced seats or pockets 78 are formed on the dial to receive and support the charged shells in a position extending radially inwardly of the dial. As illustrated in Figure 1, the molding dial includes a gas burner 80 operable to heat the dial and hence, the plastisol in the shells, so as to apply a molding heat to the liner material to thereby finally cure the same. The molding dial further includes means to stop the flow of gas to the burner 80 when the main drive motor is stopped.

Referring now to the embodiment of the invention disclosed in the modified form of Figure 13, there is shown a similar arrangement of dials which includes the shell feeding mechanism 54, chute 56, shell delivery wheel 58 and shell feeding dial 64 set forth in regard to the embodiment of Figures 1-12. The shell feeding dial 64, however, is provided with a heating element 81, preferably of the electrical radiant type for preheating the shells to an elevated temperature before the plastisol is deposited therein. It will be understood that a like heating element may be provided for the shell feeding dial of the embodiment of Figures 1-12, if desired. The empty preheated shells from the shell feeding dial 64 are transferred to a modified form of charge depositing dial mechanism 82 which is adapted to rotate or spin the shells while the charge is being deposited therein so as to distribute the plastisol evenly around the shell and cause it to flow into engagement with the fluted skirt thereby insuring that sufficient plastisol will be distributed throughout the enire interior surface of the shell to which the liner L is to be adhered.

From the charge depositing dial mechanism 82, the shells are transferred to a conditioning dial 84 having a plurality of circumferentially spaced seats or pockets 86 for receiving and supporting the successive closures. A heating element 88 is disposed over the seats in the manner previously described in connection with conditioning dial 70 so as to apply an elevated temperature to the exposed surface of the plastisol in the shells thereby curing at least a hardened or non-tacky film thereon. As before, the duration and temperature to which the plastisol is subjected may be varied to cure substantially the entire plastisol charge. Of course, where full cure is to be obtained, heating element 88 may be under the seats if desired.

The shells with surface or fully cured plastisol charges therein are then transferred to a molding dial 90 (Figures 22 and 23) mounted for rotation in a horizontal plane. The dial 90 is adapted to perform the same function as the dial 76 heretofore described, namely, to apply a final molding heat and pressure to the plastisol within the shells to form finished molded and cured liners L. In Figures 24 and 25 a somewhat modified molding dial 92 is illustrated which may be utilized in lieu of the molding dial 90.

Figures 26–33 illustrate the manner in which the machine of Figures 13–25 may be modified in order to apply ring liners L to caps $S_1$ of the screw type or caps $S_2$ of the lug type. In brief, the charge depositing dial mechanism 82 is slightly modified so that the caps are positioned under the charge depositing devices in radially offset relation. In this manner, spinning or rotating the caps at a somewhat reduced speed while the charge is being deposited will cause the latter to be distributed in substantial ring formation near the skirt of the cap.

The various dials of the machine illustrated in Figures 1–12 are driven by a suitable drive mechanism such as described in detail in the aforesaid Wilckens and Rau patent. The dials of the modified form disclosed in Figures 13–25 may be driven by a similar drive mechanism suitably modified to accommodate the different physical requirements.

The construction and operation of the shell feeding mechanism 54, chute 56, shell delivery wheel 58 and shell feeding dial 64 are described in detail in the aforesaid Wilckens and Rau patent and operate the same in the present invention so that a further detailed description is not needed. It will be understood however, that the glue applying mechanism incorporated in the Wilckens and Rau shell feeding mechanism may be eliminated for present purposes. Likewise, the construction and operation of the molding dial 76 is amply described in detail in the aforesaid Elder patent and functions in the same manner in the present invention. To adapt the Elder dial for present purposes, it is necessary only to modify the shape of the liner-contacting face of the plungers to the shape of the liner desired and to appropriately alter the controls to obtain the desired application of heat and pressure during the time intervals desired. The construction and operation of the other component dials and mechanisms of the present invention are hereinafter described in detail.

*Charge depositing dial mechanism of Figures 1–12*

Figure 3:
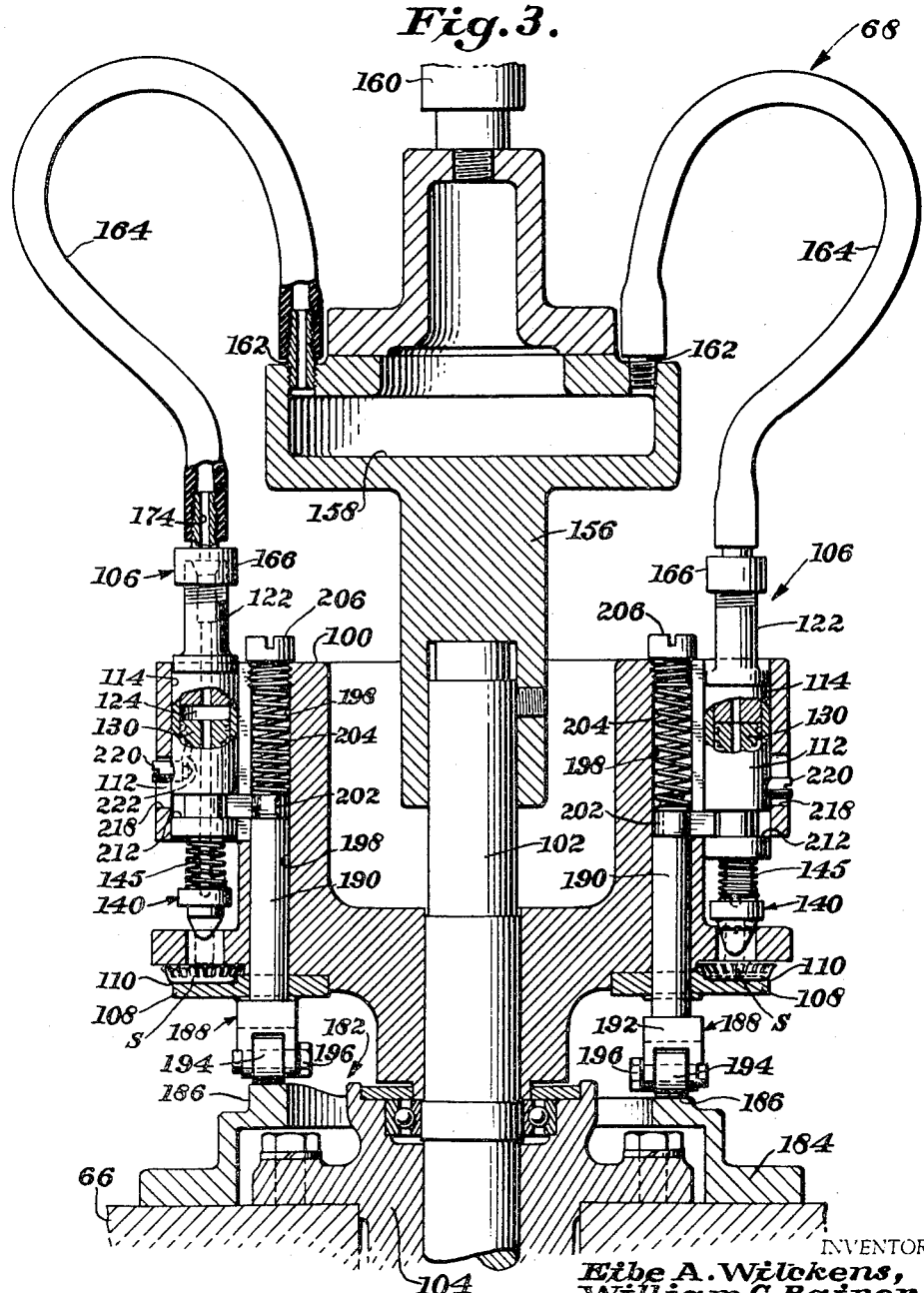
Figure 3 is a vertical sectional view of the plastic charge depositing mechanism.

Referring now to Figures 3–12, the charge depositing dial mechanism 68 includes a rotary dial frame 100 rigidly secured to a shaft 102 suitably driven from the drive mechanism mentioned above. As shown in Figure 3, the shaft 102 extends upwardly through the table 66 which carries a bearing 104 within which the shaft 102 is journaled. The dial frame 100 is provided with a plurality of circumferentially spaced charge feeding devices 106 which are mounted for vertical reciprocation during the movement of the dial. An annular ring 108 is rigidly secured to the dial frame 100 adjacent its lower end and is provided with a plurality of circumferentially spaced seats or pockets 110 corresponding with the number of charge depositing devices 106 provided.

Figures 4, 5:
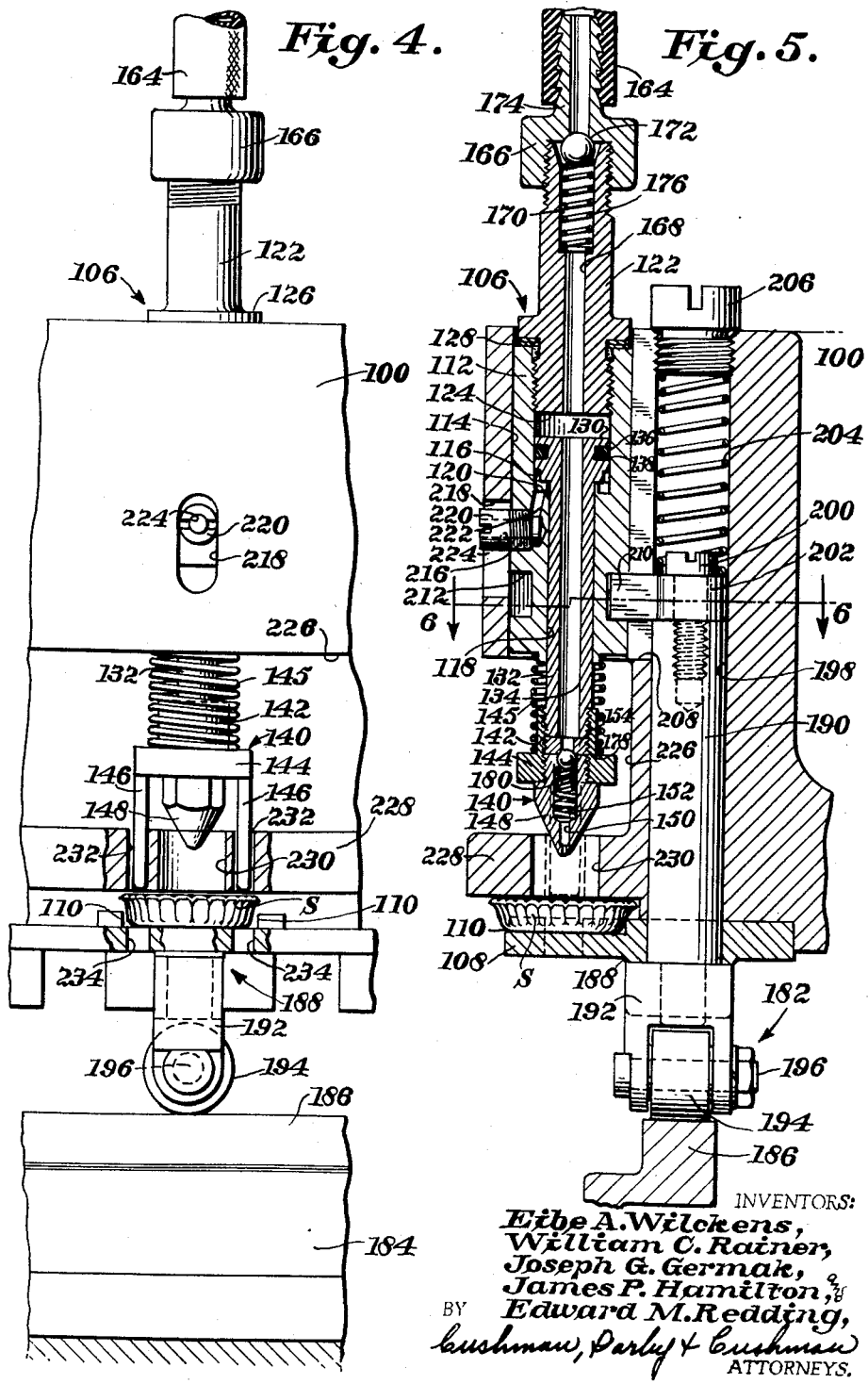
Figure 4 is an enlarged fragmentary front elevational view of one of the charge depositing devices of the mechanism shown in Figure 3.
Figure 5 is a vertical cross-sectional view of the device shown in Figure 4.

As best shown in Figure 5, each of the charge depositing devices 106 includes a cylindrical member 112 mounted for vertical reciprocating movement within a vertically extending cylindrical bore 114 formed in the dial frame 100 in alignment with an associated seat 110. The cylindrical member 112 is provided with a large axial bore 116 which extends downwardly from the upper end thereof. The opposite end portion of the cylindrical member 112 is provided with a smaller axial bore 118 which extends upwardly from the lower end thereof into communication with the bore 116. The portion of the cylindrical member 112 extending between the communicating bores 116 and 118 provides a lower end wall 120 of a charge measuring chamber within the bore 116. A fitting 122 is threadedly engaged at one end within the upper end portion of the bore 116 and includes a lower surface, defining the upper end wall 124 of the charge measuring chamber, and an annular flange 126 adapted to overlie the upper edge of the cylindrical member 112. In order to vary the volume of the charge measuring chamber, any suitable number of shims 128 may be disposed between the upper edge surface of the cylinder member 112 and the lower surface of the annular flange 126.

A piston 130 is slidably mounted in the bore 116 within the charge measuring chamber thereof and has a piston rod 132 extending from the lower end thereof which is slidable within the bore 118. An axial bore 134 extends completely through the piston 130 and piston rod 132 so as to communicate the lower end of the latter with the charge measuring chamber. The piston 130 is provided with an annular groove 136 for receiving an O-ring sealing member 138 of the conventional type adapted to engage the walls of the bore 116 and prevent passage of the sealing material past the piston.

Threadedly mounted on the lower end of the piston rod 132 below the cylindrical member 112 is a charge ejecting nozzle 140. The nozzle 140 includes an internally threaded tube 142 which engages cooperating external threads on the lower end of the piston rod and which has a lower outwardly extending flange 144. Extending between the upper surface of flange 144 and the lower surface of cylindrical member 112 in surrounding relationship with the piston rod 132, is a coil spring 145 normally biasing the piston 130 into contact with the lower end wall 120 of the measuring chamber. A pair of spaced fingers 146 extend downwardly from opposite sides of the flange 144 for a purpose hereinafter to be more fully described.

The nozzle 140 further includes a nozzle member 148 having an axial outlet passageway 150 formed in the lower end thereof and a communicating axial bore 152 formed in the upper end thereof. The nozzle member 148 is externally threaded at its upper end and cooperatively engages within the internal threads of the tube 142 and a sealing ring 154 is disposed within the tube 142 between the lower end surface of the piston rod 132 and the upper edge surface of the nozzle member 148. As the nozzle member is threadedly engaged within the tube 142, the sealing ring 154 will engage the adjacent surface of the piston rod and nozzle member to provide a leakproof seal therebetween.

As best shown in Figure 3, means are provided for supplying a source of sealing material in the form of a plastisol in a viscous state to the charge measuring chamber so that it may be ejected therefrom through the nozzle 140. To this end, a rotary member 156 providing a reservoir 158 for receiving a supply of plastisol, is rigidly secured to the shaft 102 for rotation therewith. Plastisol is supplied to the reservoir by a rotary pressure joint 160, the reservoir being completely filled with plastisol under pressure from the supply line through joint 160. Each of the charge measuring chambers communicates with the reservoir 158 through a fitting 162 extending outwardly from the reservoir. A flexible hose or tube 164 is connected to the fitting 162 at one end and has its other end connected to a fitting 166 threadedly mounted on the fitting 122. The fitting 122 is provided with a through bore 168 having an enlarged portion 170 at the upper end thereof within which a ball type check valve 172 is mounted. The ball valve 172 is urged into engagement with one end of a through bore 174 formed in fitting 166, by a coil spring 176 mounted within the enlarged bore portion 170. An outlet ball type check valve 178 is urged into engagement with the sealing ring 154 by a spring 180 mounted within the bore 152 of the nozzle member 148.

Each of the charge depositing devices 106 is vertically reciprocated by a reciprocating means, generally indicated at 182, which will now be described. Mounted on the table 66 in surrounding relation with respect to the bearing 104 is an annular cam frame member 184 having a circuitous cam track 186 extending upwardly therefrom. A cam follower 188 in the form of a plunger 190 has a bifurcated lower end 192, between the bifurcations of which a roller follower 194 is mounted, as by pin 196. A cam follower 188 is provided for each of the charge depositing devices 106 and is slidably mounted adjacent thereto within a vertically extending through bore 198 disposed in spaced parallel relation to the adjacent bore 114. The upper end of each plunger 190 is threadedly apertured to receive a bolt 200 which secures an apertured key element 202 with the plunger. Each of the cam followers 188 is urged into contact with the cam track 186 by means of a coil spring 204 disposed within the bore 198 and having its lower end in engagement with the key element 202. A plug 206 is threadedly engaged in the upper end of the bore 198 and engages the upper end of the spring 204. The upper portion of the dial frame between each pair of bores 114 and 116 is cut away to provide a communicating vertical slot 208 through which a projecting tab 210 formed on the key element 202 is adapted to extend.

As best shown in Figures 9 and 10, the outer surface of the cylindrical member 112 is provided with an annular groove 212 spaced upwardly from the lower end thereof. A communicating vertical groove 214 extends upwardly from the lower end of the cylindrical member into communication with the annular groove 212.

In connecting each of the charge depositing devices 106 with its associated cam follower 188, the cylindrical member 112 is lowered into its bore 114 and suitably rotated until vertical groove 214 registers with the projecting tab 210 thus permitting the latter to enter the annular groove 212. The device is then rotated until a threaded aperture 216 registers with a corresponding elongated slot 218 provided in the outer surface of the dial frame in communication with each bore 114. A threaded plug 220 may then be extended through the slot 218 and engaged within the threaded aperture 216 so as to hold the cylindrical member against rotation thereby preventing the vertical groove 214 from coming into registry with the projecting tab 210.

In order to provide a means for detecting the leakage of sealing material past the O-ring sealing member 138 of each of the pistons 130, a passageway 222 extends through the cylindrical member between the end wall 120 and threaded aperture 216. The plug 220 may be provided with an axial through bore 224 which communicates the passageway 222 to the exterior of the dial frame. In this manner, if a sealing ring member should become worn or for some other reason function improperly so as to permit sealing material or plastisol to leak past the piston, such plastisol will discharge through the axial bore 224 of the plug and be readily discerned by the operator so that suitable repairs can be promptly made.

The portion of the dial frame within which the nozzle 140 reciprocates is cut away as at 226 so as to provide a lower annular flange or ledge 228 spaced just above the annular ring 108. The ledge or flange 228 between each seat and charge depositing device 106, is provided with a central aperture 230 in alignment with the associated bore 114 and a pair of spaced parallel apertures 232 in alignment with the fingers 146 for receiving the same. The annular ring 108 is provided with a registering pair of vertically extending apertures 234 disposed below the apertures 232 at each seat or pocket thereof.

In the operation of the charge depositing dial mechanism 68, it will be seen from Figure 2, that as the shells S are transferred thereto from the shell feeding dial 64, the charge depositing device disposed above the seat upon which the shell is supported will be in a raised position such as shown in Figures 4 and 5. It will be noted that the lower end of fingers 146 of the device are disposed within the apertures 232 thus leaving the seat free for the entry of the shell thereon. It will also be noted that the spring 145 maintains the piston in its lowermost position with the upper end surface thereof spaced below the upper end wall 124 of the charge measuring chamber and that the sealing material in the form of a plastisol in a viscous state will be present within the measuring chamber and the communicating bores 168 and 170 of the fitting 122 and the communicating bore 134 of the piston and piston rod. The nozzle will also be filled with plastisol which is too viscous to flow out of the small hole in the nozzle when the pressure is cut off. Since it will not harden when merely exposed to air it will not clog the hole. As the dial rotates, the shell S is carried from the position where it was received from the shell feeding dial to a position where it is transferred to the conditioning dial 70. During this period, which constitutes approximately one-half of a revolution of the dial, the cam track 186 initially drops off causing the cam follower 188 to move downwardly under the influence of coil spring 204. Movement of the cam follower 188 downwardly will carry with it, by virtue of the engagement of projecting tab 210 in annular groove 212, the charge depositing device 106. As the charge depositing device is moved downwardly, the lower end of the fingers 146 will contact the shell S so as to stop the downward movement of the nozzle 140, piston rod 132 and piston 130 so that upon further downward movement, the upper end wall 124 of the charge measuring chamber will move toward the upper surface of the piston 130. As the two surfaces move together an amount of plastisol equal to the displaced volume between surface 124 and the top of the piston is forced down through bore 134. An equal amount is thus forced out of the completely filled nozzle. When the two surfaces engage each other, no further downward movement of the cylindrical member is possible. The amount of plastisol ejected in the charge is thereby accurately predetermined by the distance of relative movement between the upper surface of the piston 130 and the upper end wall 124 of the chamber.

As briefly set forth above, the upper end wall 124 of the charge measuring chamber is longitudinally adjustable by virtue of the threaded connection of the fitting 122 within the upper end of the bore 116 and shims 128 may be utilized to space the end wall in any longitudinal position of adjustment. It will be noted that by making the engagement of the upper surface of the piston with the upper end wall of the chamber, the limit of relative movement, the charge measuring chamber is self-purging. That is, if the plastisol within the chamber should initially have air entrained therein, the action of the piston within the chamber will force such air outwardly therefrom with the plastisol as it is ejected during the course of the first few charges deposited. In this manner, an accurate predetermined charge is insured.

After the charge has been deposited into the shell but before the device reaches the position for transferring the shell to the precuring dial, the cam track 186 is directed upwardly so as to move the charge depositing device upwardly. At the transfer position, fingers 146 will be out of engagement with the shell in the position shown in Figure 4 thus enabling the shell to be freely transferred from its seat. During the upward return movement of the charge depositing device, spring 145 will cause the piston to move away from the upper end wall 124 of the charge measuring chamber. The plastisol being under pressure will quickly refill the measuring chamber.

From the above, it will be seen that if for some reason the shell feeding dial 64 should fail to feed a shell to one of the seats on the charge depositing dial, the associated charge depositing device will not operate to eject a charge. Thus, if no shell is present on a seat during a revolution of the dial mechanism, the associated charge depositing device will be moved down by the action of cam track 186 and cam follower 188. However, no relative motion of the piston within the charge measuring chamber will take place since this movement is dependent upon the engagement of fingers 146 with a shell. With no shell on the seat, the fingers 146 will enter apertures 234 in the ring 108 during the downward movement of the charge measuring device and no ejection will occur.

*Charge depositing dial mechanism of figures 13–23*

The charge depositing mechanism 82 of the embodiment illustrated in Figures 13-23 is similar to the charge depositing dial mechanism 68 heretofore described and may be used in lieu thereof in the machine of Figures 1-12 if desired. The dial mechanism 82 includes additional features and hence, is somewhat modified but includes many of the elements of the previous embodiment. As shown in Figures 14-20, similar parts of the dial mechanism 82 are designated by corresponding primed numerals of the parts previously described in connection with the charge depositing dial mechanism 68.

The principal difference between the two dial mechanisms consists in the added feature of providing a means for rotating the closures about their respective axes during their movement on the dial mechanism. Hence, only such added elements as are provided to perform this function and the modifications of the prior structure occasioned thereby will be described, it being understood that the structure not specifically mentioned corresponds with the structure of the dial mechanism heretofore set forth.

To this end, the annular seat providing ring 108' is provided with a downwardly directed annular flange extension 240 which is provided with a series of circumferentially spaced vertical bores 242 corresponding in number to the number of seats provided. Journaled within each of the bores 242 is a hollow vertical spindle 244 having an annular seat 246 threadedly mounted on the upper end thereof. Each of the seats 246 is rotatably mounted within a suitable recess 248 formed in the annular ring 108' and includes a plurality of circumferentially spaced pockets 250 for receiving permanent magnets 252.

The lower end of each hollow spindle 244 has a roller 254 rigidly connected therewith for engagement with an endless belt 256 trained about a horizontally disposed driving pulley or roller 258, spaced follower rollers 260 and 262 and certain of the pulleys 254 of the dial mechanism. It will be seen from Figure 13, that during each revolution of the dial mechanism 82, each roller 254 will engage the traveling endless belt 256 during a portion of the revolution so as to rotate the associated seat 246.

Since the crowns are rotated during the injection of the charge therein, it would not be possible to provide a no-shell no-charge means, such as fingers 146, which engage the shell. Hence the dial frame 100' has been modified so as to include the cut out portion 226 previously described and instead a vertically extending through slot 264 extends between each bore 114' and the exterior of the dial frame. Pivotally carried within the lower portion of each slot 264, as by pivot pin 266, is a locking element or bell crank 268 having a lower arm 270 arranged to be engaged by a shell S and an upper arm 271 operatively connected with the associated charge depositing device 106'. The upper end of arm 271 is notched as at 272, to receive the lower edge of the cylindrical member 112' and an inwardly facing cam surface 274 extends downwardly from the notch. An annular coil spring 276 engaging all of the bell cranks 268 urges the upper arms of the latter inwardly.

Relative movement of the piston within the charge measuring chamber is effected by cooperating stop surfaces between nozzle 140' and the dial frame 100'. To this end, the nozzle 140' may be of single piece construction incorporating the flanged tube 142 and nozzle member 148 heretofore described without the provision of fingers 146. The lower end of bore 114' is reduced to provide an annular shoulder 278, providing one of the stop surfaces, the other of which is provided by the annular flange 144' of the nozzle 140'.

A further alternative construction in the present embodiment is the provision of a radially extending discharge passageway 280 in lieu of the axial bore 224 in plug 220 and communicating passageway 222 previously provided.

In the operation of the dial mechanism 82, a shell is transferred from the shell feeding dial to a seat 246 on the dial frame. The position of the bell crank 268 just before the transfer of the shell onto the associated seat is shown in Figure 14 wherein the lower edge of the cylindrical member 112' is engaged within the notch 272 and thus, the charge depositing device is held against downward movement. Just before the shells are transferred onto the seat, cam track 186' rises sufficiently to relieve the pressure exerted by spring 204' between the lower edge of the cylindrical member and the notch 272. The upper portion of the arm 271 adjacent the notch prevents the bell crank from pivoting under the action of spring 276 in a clockwise direction as viewed in Figure 14. As the shell is transferred from the shell feeding dial to the seat 246 of the dial mechanism 82, the leading upper edge of the shell will engage the lower arm 270 of the bell crank thus moving the upper arm outwardly against the action of spring 276 and moving the notch 272 away from the cylindrical member. As the same instant, cam track 186' falls off slightly permitting the lower edge of the cylinder to move downward a slight distance under the influence of spring 204' into the position shown in Figure 15. The upper arm 271 of the bell crank is thus prevented from moving inwardly by engagement of the cam surface 274 with the lower edge of the cylindrical member as the leading upper edge of the shell skirt passes from beneath the outer end of arm 270. The shell is then centered on the seat 246 and held in engagement therewith by the magnets 252.

The roller 254 next engages the traveling endless belt 256 so as to cause the seat with the shell thereon to rotate. Immediately after the shell begins to rotate, cam track 186' falls off sharply permitting the charge measuring device 106 to move downwardly under the influence of spring 204. Cam 186' may be contoured so that the rate of plastisol ejection can be accurately controlled. As the device moves downwardly, flange 144' will engage shoulder 278 to stop the movement of the nozzle, piston rod and piston while the cylindrical member and its associated structure will continue to move downwardly. In this manner, the upper end wall 124' of the charge measuring chamber will move toward the upper surface of the piston until it engages the same to eject a predetermined charge of plastisol into the spinning shell as previously described.

It is to be noted that the longitudinal axes of the charge depositing device 106' and seat 246 are offset laterally so that the device 106' will not deposit the charge into the exact center of the shell but at a point offset laterally therefrom. By offsetting the axes as mentioned above, it is possible to insure that the plastisol will be supplied throughout the interior of the shell without an excessively high r.p.m. of the shell itself. Of course, it is possible to inject the plastisol into the precise center of the shell, but the former arrangement is preferred since it achieves the same results with a slower spinning of the shell. The offset axes while not essential to the operation of the machine insures a more uniform distribution of the plastisol. Each shell will make many revolutions during the injection cycle. Figure 16 illustrates the condition of the charge depositing device and bell crank at the end of the charge ejecting stroke.

As the shell approaches the position where it is to be transferred to the conditioning dial, cam 186' rises sharply to move the cylindrical member 112' upwardly carrying with it the nozzle, piston rod and piston. As the device moves upwardly, the upper edge of annular flange 144' will engage the cam surface 274 so as to move the upper arm 271 outwardly and dispose the lower arm 270 above the level of the upper edge of the shell skirt as shown in Figure 17. The roller 254 then moves out of engagement with the belt 256 just before the shell is carried to the position of transfer to the conditioning dial. During the upward movement of the device, spring 145 will act to move the piston away from the upper end wall 124' of the measuring chamber so as to draw in a new charge from the reservoir.

Immediately after the shell is transferred from the seat, cam 186' drops away permitting the cylindrical member 112' to engage within the notch 272 in the manner illustrated in Figure 14.

It will be seen that if no shell is transferred to the seat by the shell feeding dial, the bell crank will not be pivoted so that the notch will not move out of the downward path of travel of the cylindrical member. Thus, the cylindrical member will be locked in the position shown in Figure 14 during that revolution of the dial and no relative movement will take place to eject a charge.

*The molding dial mechanism of Figures 13–23*

While the vertically disposed molding dial of the previously described embodiment performs satisfactorily, there appears to be some disadvantage in moving the shells out of a horizontally disposed position to the fluid state of the lining material. Thus, while the vertically disposed dial of the previous embodiment will properly function to finally mold and cure the liners L, it is preferred to mold and cure the liners on a horizontally disposed dial wherein the shells are at all times maintained in horizontal position.

The molding dial 90, more particularly shown in Figures 22 and 23, is disposed to rotate in a horizontal plane about a vertical axis and includes a rotary upright shaft 300 on which is fixedly secured a rotary dial frame 302. The dial frame 302 is provided with a plurality of circumferentially spaced plunger devices, generally indicated at 304, hereinafter more fully described. An annular ring 306 is suitably secured to the lower peripheral portion of the dial frame and provides a plurality of circumferentially spaced seats 308, corresponding in number to the number of plunger devices, for receiving and supporting the shells during their movement with the dial.

Each of the plunger devices 304 includes a plunger 310 mounted for vertical reciprocation and having a molding head 312 on the lower end thereof. The plunger 310 is mounted within the dial frame by means of a flanged bushing 314 rigidly mounted by any suitable means, such as set screw 316, within a vertical bore 318 in the upper peripheral portion of the frame. The outer peripheral portion of the frame is cut away as at 320 so as to provide an upper flange portion 322 through which the bore 318 extends and a lower flange portion 324 through which an aligned vertical bore 326 extends for slidably supporting the plunger head 312. Extending through the upper end of the plunger head 312 is a horizontally disposed pin 328 having a cam roller 330 rotatably mounted thereon outwardly of the plunger head and a guide roller 332 rotatably mounted thereon inwardly of the head. The roller 332 is adapted to vertically reciprocate within a vertically extending guide slot 334 extending inwardly of the cut out portion 320 and prevents the plunger from turning about its own axis.

Mounted upon the dial frame 302 is an upwardly extending annular frame member 336 having a plurality of circumferentially spaced bores 338 disposed in alignment with the bores 318 and 326 so as to receive the upper end portions of the plungers 310, which constitute separate plunger elements rigidly secured by any suitable means to the main body of the plungers. A fixed collar 340 is mounted on each plunger 310, at a point spaced below the upper end thereof and is arranged to vertically reciprocate within a bore 338 of the frame 336. A pressure applying coil spring 342 has its lower end in engagement with the upper surface of the collar 340 within the bore 338 and has its upper end in engagement with an apertured plug 344 threadedly engaged within the upper end portion of the bore 338. The movement of the plunger downwardly under the influence of spring 342 is limited by means of a pair of cooperating stop nuts 345 threadedly engaged on the plunger 310 and arranged to engage the flanged end of bushing 314.

The upper end of the plunger 310 is provided with a notch 346 adapted to receive a pivoted latch member 348. The latch member 348 is pivotally mounted on a short stem 350 threadedly mounted in the annular frame member and additional relatively longer stems may extend vertically through the annular frame member 336 into threaded engagement with the dial frame 302 so as to secure the two frames together. A coil spring 352 surrounds the upper end of the stem 350 and has its upper end fixed to the stem by means of a nut 354. The lower end of the coil spring 352 is laterally bent as at 356 and extends through an aperture 358 in the latch member so as to apply a spring pressure to the latch member causing the same to pivot into engagement with the upper end of the plunger 310.

Referring now to Figure 13, it will be seen that as the molding dial rotates in a clockwise direction, a shell will be transferred from the conditioning dial while the associated plunger is held in a raised position by the engagement of latch member 348 in notch 346, such as shown on the right hand side of Figure 22, thus permitting unobstructed entry of the shells onto the seats 308. After the shells have been centered on the seats, the associated plunger device is lowered by means of a latch engaging trip roller 360 fixedly secured externally of the dial at a point adjacent the periphery thereof so that as the associated plunger device 304 moves past the trip roller, the outer end of latch member 348 will engage the same. As mentioned above, when the plunger is in its raised position, latch member 348 is normally spring urged into engagement with the notch 346 so as to retain the plunger in its raised position against the action of spring 342. When the latch member engages trip roller 360, it is pivoted away from the plunger against the action of spring 352 thus moving out of notch 346 and permitting the plunger to move downwardly under the influence of spring 342.

Disposed below annular ring 306 adjacent the point of transfer of the shells from the conditioning dial, and extending partially around the periphery of the dial is a heating element 362 for applying a molding heat to the liners so as to finally cure the same in their molded shape. It will be understood that other means may be employed and that the plungers and/or the ring may be heated. After the liners L have been completely molded and cured, cam roller 330 engages a fixedly supported, short cam element 364 arranged to move the plunger upwardly against the action of spring 342 thus permitting the latch member 348 to pivot into the notch 346 under the influence of spring 352. In this manner, the latch member holds the plungers in a raised position permitting the finished closure to be removed from the seats and then new shells from the conditioning dial to be transferred thereto.

It will be understood that various other arrangements may be utilized for reciprocating the plungers in timed relationship, such as pneumatic or hydraulic means or a continuous cam track. The arrangement disclosed above is preferred in that the spring pressure is cheaper to provide and easier to maintain as compared to the fluid operated arrangement. In adddition, by providing only a very short cam to raise the plungers against the spring action and then maintaining the plungers in a raised position by means of tripped latch members, the excessive frictional contact incident to the operation of a continuous cam track means is obviated.

The molding dial mechanism of Figures 24–25

In Figures 24 and 25 there is shown a molding dial mechanism 92 which constitutes a simplification of the molding dial mechanism 90 previously described and is a preferred construction. This molding dial mechanism 92 includes many of the elements of the dial mechanism 90 and hence, such elements are not hereinafter described in detail but are referred to, where necessary, by corresponding primed numerals.

The dial frame 302' is fixed to shaft 300' for rotation therewith about a vertical axis and includes upper and lower peripheral flange portions 322' and 324', apertured as at 318' and 326' respectively. Annular ring 306' is suitably secured to the lower peripheral portion of the dial frame and provides a circumferentially spaced seat 308' for receiving and supporting the shells during their movement with the dial. In general, the dial frame 302' constitutes a modification of the dial frame 302 previously described, to the extent of the elimination of the upper annular frame member 336.

The plungers 310' of the plunger devices 304' are reciprocably supported at their lower ends by engagement of molding heads 312' in the apertures 326' as before. However, the support for and construction of the upper end of the plunger devices 304' is modified somewhat due to the elimination of the frame member 336. More specifically, the apertures 318' formed in the flange portion 322' are internally threaded to receive externally threaded members 370. Each member 370 includes a radially extending flange 372 adapted to engage the upper surface of the flange portion 322' when the lower threaded end of the member is engaged within its associated aperture. Extending upwardly from the lower end of each member 370 is an axial bore 374 within which the upper end of the associated spring 342' is received. The lower end of each spring 342' abuts the upper edge of the associated molding head of the plunger so as to resiliently urge the latter into its lowermost position.

The upper end of each plunger 310' is threaded to receive a nut 376 which engages the upper surface of the associated member 370 to limit the downward movement of the plunger under the influence of spring 342'. These nuts also constitute the means by which the latch members 348' serve to maintain the plungers in their raised position. Referring to the right hand side of Figure 24, it will be seen that each latch member 348' is normally spring urged, as by spring 352', into engagement with the upper end between the upper surface of the associated member 370 and the lower surface of the associated nut 376. To accommodate this somewhat modified construction, the shape of the latch members 348' may be altered as indicated in Figure 25.

The operation of the modified molding dial mechanism 92 is the same as that described in connection with the dial 90. Briefly, as each shell is transferred from the conditioning dial onto a seat 308' of the molding dial mechanism 92, the associated plunger 310' will be disposed in its raised position with the associated latch member 348' preventing downward movement by virtue of its engagement between the associated nut 376 and member 370. After a predetermined amount of rotation of the dial, trip roller 360' is engaged by the outer end of the associated latch member, thus moving the latter away from the plunger 310' and out of its position of engagement between nut 376 and member 370, permitting the spring 342' to move the plunger head into engagement with the conditioned charge in the shell.

In order to accomplish the movement of the latch members into this release position more readily, a short cam element 380 may be provided on the main frame so as to engage the cam rollers 330' just before the latch members strike the trip roller 360'. This cam element 380 serves to raise the plungers slightly so that the latch members may be pivoted into their release position free from the frictional resistance occasioned by the spring pressed engagement of nuts 376 therewith. Cam element 380 is shaped so as to allow the plungers to drop quickly below the lock position immediately after the latch members have been moved to their release position.

After the hot molding of the charge has taken place, cam element 364 is engaged by the associated cam roller 330' so as to raise the plunger. When the plunger raises, spring 352' urges the latch member into its position of engagement between the nut and member so as to maintain the plunger in its raised position until the finished closure is discharged and a new charged shell is received.

As was noted above, the dial mechanism 92 constitutes a preferred embodiment because of its simplified construction. Of particular significance, is the fact that the nuts 376 perform the dual function of coacting with the latch members to maintain the plungers in their raised position and of coacting with the members 370 to determine the limit of downward movement of the plungers. With respect to this latter function, it will be noted that the limit of downward plunger movement may be varied by merely turning the nuts on the threaded upper ends of the plungers. It will be understood that the cam element 364 may be shaped so as to raise the plunger a distance sufficient to permit engagement of the latch member beneath the nut in its lowermost position of adjustment.

Charge depositing dial mechanism of Figures 26–33

The structure illustrated in Figures 26–33 particularly indicates the manner in which the machine of Figures 13–25 may be modified to apply ring liners to the caps $S_1$ and $S_2$ of the screw or lug type respectively. It will be understood, however, that the principles of the present invention may also be used to line can ends and the like, or any other circular seal requiring a circular gasket. As shown in Figures 30–33, the screw cap $S_1$ and lug cap $S_2$ are of conventional construction including a shell provided with a threaded skirt and a lugged skirt respectively. The ring liner $L_1$ may be disposed near the skirt either in a circular indentation formed in the shell, as shown in Figures 30 and 31, or directly on the flat interior surface of the cap, as shown in Figures 32 and 33, as is well known in the art.

Figure 28:
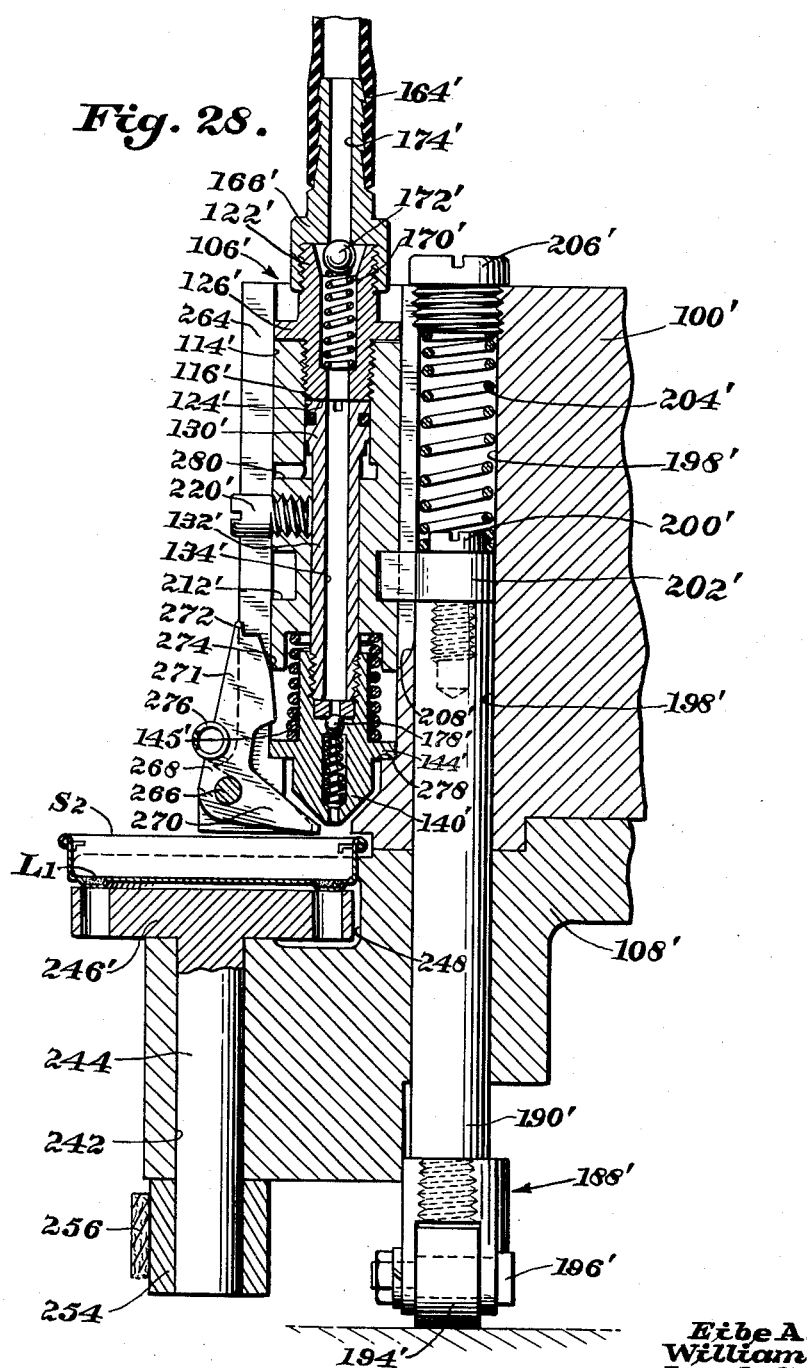
Figure 28 is a view similar to Figure 16 of the mechanism shown in Figure 26.

It will be understood that since the sizes of screw and lug caps vary, the size of the various seats and shell handling elements of the machine may be varied accordingly. In Figures 26–29, a cap of a size larger than a standard crown is illustrated as being supported by a seat 246' of an increased diameter. However, the significance of the modified seat is not so much in its increased size as the fact that it positions the cap under the nozzle so that the latter is radially offset from the axis of the cap. In this manner, the nozzle discharges the sealing material into the interior of the cap at a point near the skirt thereof. Hence, by imparting a rotary motion to the cap during the period of material discharge, the latter will be distributed in ring formation adjacent the skirt of the cap.

Where a cap is provided with a circular indentation such as disclosed in Figures 28, 30 and 31, this ring of sealing material will be deposited within the circular indentation and have a substantially flat upper surface. Hence, the charge engaging surface of the plunger heads on the molding dial must be altered to conform to the ring shape of the cap liners.

While it is greatly preferred to mold the liners under heat and pressure, it is entirely possible with this type of cap to dispense with the molding step. In that case, the charged caps may be passed through a heated tunnel instead of being cured in a dial, or cured in a dial without plungers.

Where a flat cap without a circular indentation, such as disclosed in Figures 27, 29, 32 and 33, is utilized, the charge will deposit in ring formation having a convexly curved upper surface in cross-section. This upper surface is subsequently shaped to form a finished liner by appropriately modified plunger heads.

It will be noted that in modifying the crown liner applying machine of Figures 13–25 to apply ring liners to caps of the lug or screw type, the rotation of the cap serves to distribute the charge substantially throughout the interior surface area to which the liner is applied. This same function results from the rotation or spinning of the crowns in the initial embodiment. In both instances, rotation serves to distribute or spread the charge from the point of material introduction into contact with the interior surface area of the closure to which the liner is to be applied. In the case of the crowns, the point of material introduction is near the axis of the crowns and rotation serves to spread the charge outwardly to extend circumferentially by centrifugal force. In the case of the caps, the point of material introduction is near the skirts of the caps and rotation serves to spread or distribute the charge in ring formation by movement of the closure while the charge is being deposited. In the latter case, rotation must be performed during the ejection of the charge, while in the former case, rotation may be accomplished after the charge has been deposited, if desired.

With the above in mind, it will be understood that the rate of rotation utilized when dealing with caps will be less than that used with crowns. Preferably, the rate in the case of caps is such that the centrifugal force established is not sufficient to cause the material to flow outwardly and extend circumferentially. Of course, where the charge is deposited in a circular indentation, higher speeds may be utilized without causing flow due to the resistance offered by the outer wall of the indentation.

While it is preferred not to cause flow by centrifugal force in the case of screw and lug caps such as those illustrated, it will be understood that in other cases this action may be desirable. For example, in applying liners to side sealing caps of the vacuum type in accordance with the present invention, the charge may be introduced at a point near the skirt and spread outwardly to extend circumferentially in ring formation into contact with the interior surface area of the cap to which the liner is to be applied.

It can thus be seen that there has been provided by the present invention a high speed machine capable of carrying out the methods set forth in the aforesaid Rainer et al. application. The machine disclosed in Figures 13–23 is particularly advantageous in that the operation thereof insures that the plastisol will strongly adhere to the shell and be distributed throughout the entire interior thereof in engagement with the fluted skirt.

By preheating the empty shells before the plastisol is deposited therein, the interior coating of the former is thereby temperature conditioned to receive a charge of the latter, which latter in making material contact with the shell, becomes more suitably disposed to penetrate lightly into the lacquered surface and thus substantially enhance the superficial bond which otherwise would result between liner and shell under the momentary pressure influence of the curing dial. In addition, the heat of the shell has an initial tendency to decrease the viscosity of the plastisol thereby making it possible to spread the charge centrifugally at lower rotational speeds. The shells may be heated to temperatures from above room temperature to 150° F., the preferred temperature being 150° F. Of course, the time required to bring the shells up to the optimum preheated temperature will depend upon the intensity of the heat applied and the speed requirements of the shell feeding dial.

As pointed out in the Rainer et al. application, without the spinning or rotation provided by the machine of Figures 13–23, in some cases, the plastisol after injection into the center area of the shell, does not spread out so as to cover the entire interior surface thereof. The surface concavity of the shell (5½ inch radius) serves as a gravity barrier preventing complete lateral movement of the plastisol so that, in effect, the charge may be non-uniformly spread and irregularly shaped of globular-definition due to the fact that the plastisol does not always travel straight downward into the shell. Under these conditions, after the shell has passed through the conditioning dial and into the molding dial, the plastisol being controlled to an exact volume, frequently does not assume the full contour of the plunger. Thus, there may be left a void in the plastisol area of the cured liner on one side and an excess of plastisol squeezed upwardly into the fluted skirt on the side directly opposite thereto. It is necessary to reject and scrap such crowns.

By spinning or rotating the shells with the charge deposited therein, the plastisol is centrifugally impelled toward the interior skirt walls of the shell thus insuring that a uniform amount of plastisol will be distributed around the entire interior of the shell. By controlling the speed of rotation, as by means of a variable speed drive mechanism for the belt, and simultaneously, the speed of injection of the plastisol by means of properly contoured cam 186, very satisfactory distribution can be obtained. The speed of rotation of the shells may be from about 600 to 2,000 r.p.m., with 1,000 r.p.m. being preferred. The r.p.m. is preferably increased in proportion to the increase in viscosity of the plastisol employed. As noted above, the preheating of the empty shells has the effect of decreasing the viscosity of the plastisol deposited therein. This speed of rotation is maintained for a suitable period, e.g. between 0.5 and 0.6 second.

As illustrated in Figure 13, the crowns are set into rotational movement on the charge depositing dial mechanism just before the charge is ejected therein and this rotation is maintained for 0.6 second during which time the charge is deposited and centrifugally distributed throughout the interior to the skirt wall. It will be understood that spinning or rotation may be commenced after the charge is deposited if desired. The spinning or rotation is stopped just before the shells are transferred onto the conditioning dial.

As noted above, where caps of the screw or lug type are utilized, the rotational speed is reduced somewhat. Since the optimum rotational speed in this case will depend upon the size of the cap utilized, the recitation of speed ranges would have little significance.

On the conditioning dial, the plastisol within the shell is subjected to radiant heat which impinges on the exposed plastisol surface and heats the same to a temperature of from 200° F. to 300° F., preferably 250° F. thereby curing a tack-free surface film thereon, leaving the under-portion still in a tacky uncured condition. The exposure time to the radiant heat can be from .5 to 4 or 4½ seconds and with the machine illustrated in Figure 13, the plastisol in the shell is heated to a temperature of 200° F. while on the dial 1 second. The significance of precuring a tack-free surface film on the charge is that it offsets any tendency of the plastisol to stick to the molding punch and it permits the utilization of a subsequent low molding pressure. Pinpoint deposits left on the molding plunger act as foci for further building up of material. Since the thermal life for a vinyl chloride plastisol, for example, is extremely short, these deposits decompose on the plunger head and redeposit on subsequent liners during the molding and adhere tenaciously thereto, resulting in the liners or portions thereof being forcibly pulled out of the shell when the plunger is cammed into a raised position.

The above-mentioned sticking tendency can also be eliminated by effecting a substantially full cure of the plastisol in the shell on the conditioning dial. Full cure is obtained in the same time as surface cure, the speed of the cure depending on the intensity of the heat source. Higher pressures, however, are usually required for molding a fully cured plastisol than is demanded for one that is but surface cured. After hot molding of the fully cured plastisol, adhesion thereof to the shell, which is usually lacquered, is of substantially the same order of magnitude as that after hot molding of the totally uncured or surface cured plastisol.

The closures then move onto the molding dial where the plastisol sealing material is subjected to a molding temperature of about 325° F. to 375° F. and a molding pressure of about 20 to 60 p.s.i. In the embodiment illustrated in Figures 13-23, a preferred temperature of about 350° F. is applied from the point where the shells are transferred onto the dial to the point where they are transferred therefrom. Some time after the shells have entered the dial, the plungers are lowered to apply a preferred pressure of 25 p.s.i. to the liner material. As shown, this pressure is maintained for approximately 2½ seconds. After this period, the cam operates to raise the plungers so that during the last 3½ seconds an after cure temperature of 350° F. is applied to insure a complete cure of the liners in their molded shape. It should be noted that the plungers may be lowered either before or after the plastisol has been heated to the molding temperature.

By the use of the machine illustrated in Figures 13-23, with the times, temperatures and pressure indicated above, there can be employed any of the compositions disclosed in the aforesaid Rainer et al. application wherein the composition is deposited into the cap prior to the formation of the liner, to form finished closures. As a typical example there is employed a composition of the following ingredients in parts by weight.

A

Geon 121 (polyvinyl chloride having a molecular
  weight of about 89,000) _____ 60.00
Dioctyl phthalate (di-2-ethyl hexyl phthalate) ___ 40.00
Calcium stearate _____ 3.00
Staybelite No. 10 (glycerol ester of hydrogenated
  rosin) _____ 3.00

The above illustrates one example of carrying out the method of the present invention by means of the machine disclosed in Figures 13-23 wherein a non-tacky film is cured on the exposed surface of the plastisol prior to molding. Where a substantially full cure is desired prior to molding with the use of the same machine, the conditioning temperature is raised to a preferred temperature of 300° F. and a subsequent molding pressure of between 120 to 200 p.s.i., preferably 150 p.s.i. is employed.

It will be understood that the methods of the present invention may be carried out with the use of other resins. Likewise, machines other than those disclosed can be employed to carry out the methods. With the use of the machines disclosed, it will be apparent that suitable changes may be made, for example, the location, speed and proportionate sizes of the various dials, so as to accommodate different heating intervals and temperatures and molding intervals and pressures.

Below are given examples of other compositions which may be utilized.

Compositions in parts by weight:

B

Exon 654 (a vinyl chloride polymer having a
  molecular weight of about 89,000) _____ 56.00
Geon 202 (a vinyl chloride-trichlorethylene
  copolymer having a molecular weight of
  about 49,000 and containing at least 95%
  vinyl chloride) _____ 4.00
Dioctyl phthalate _____ 40.00
Paraplex G-62 (a polymeric dihydric alco-
  hol-dicarboxylic acid-ester-epoxide, specifi-
  cally a glycol-sebacate-epoxide) _____ 3.00
Staybelite No. 10 _____ 3.00

C

Exon 654 _____ 56.00
Geon 202 _____ 4.00
Dioctyl phthalate _____ 50.00
Paraplex G-62 _____ 5.00
Staybelite No. 10 _____ 5.00

D

Vinylite GYNV (high molecular weight
  polyvinyl chloride) _____ 56.00
Geon 202 _____ 4.00
DOP-20 (dioctyl phthalate) _____ 30.00
Paraplex G-62 _____ 3.00
Goodrite GP-261 _____ 10.00

E

Geon 121 _____ 60.00
DOP-20 _____ 40.00
Paraplex G-62 _____ 3.00
Staybelite No. 10 _____ 3.00

The use of Geon 202 which is a vinyl chloride-trichloroethylene copolymer containing a small amount of trichloroethylene, is especially advantageous. By reason of its molecular configuration and particle size the copolymer cited has an initial as well as lasting influence on the viscosity behavior of any given plastisol system in which it functions as a constituent. By its mere presence it depresses initial viscosity and develops longer shelf-life in the plastisol. In general, the copolymer is employed in an amount of from 2 to 10 parts per 100 parts of the total resin content.

In general the following proportions of the various materials forming the plastisol can be used.

Vinyl chloride polymer or copolymer __ 100 parts.
Plasticizer _____ 60 parts to
                                        150 parts.
Filler _____ 0 part to 150
                                        parts.
Stabilizer _____ 1 part to 10
                                        parts.
Glyceryol ester of hydrogenated rosin ___ 0 part to 10
                                        parts.

When a filler is employed, it is preferably present in an amount from 20 to 100 parts per 100 parts of polymer. The glycerol ester of hydrogenated rosin reduces the migration of the plasticizer in the plastisol and when employed is preferably present in an amount of at least 5 parts per 100 parts of polymer.

It is to be understood, however, that the forms of the invention herewith shown and described are to be taken as the preferred embodiment of the same and that various changes may be made without departing from the spirit of the invention or the scope of the appended claims.

We claim:

1. Apparatus for applying liners of moldable sealing material to the interior of closures having skirts comprising means for continuously moving successive closures along a predetermined path between a naked closure receiving position and a finished closure discharging position, a plurality of charge depositing devices movable with said closures along a portion of said path for depositing a measured charge of said material in a viscous state respectively into the interior of successive closures, means operable during the movement of said closures along said path for rotating said closures about their axes so as to cause the charge to be distributed substantially throughout the surface area to which the liner is to be applied, means operable during the movement of said closures along said path for heating the material deposited therein, and means operable during the movement of said closures along said path for pressing and molding the material in the closures to shape said material and form liners in the interior thereof.

2. Apparatus for applying liners of moldable sealing material to the interior of closures having skirts comprising a first dial rotatable about a vertical axis having a plurality of circumferentially spaced seats for supporting a series of closures with said skirts extending upwardly, a viscous sealing material depositing device on said first dial above each of said seats, said first dial being arranged to receive successive naked closures at a first position and to carry the same to a second position, said devices being operative to deposit a measured charge of sealing material into respective closures during their movement between said first and second positions, a second dial rotatable about a vertical axis having a plurality of circumferentially spaced seats for supporting a series of said closures with said skirts extending upwardly, means at said second position for transferring successive closures from said first dial to said second dial, said second dial being arranged to carry said closures from said second position to a third position, means for heating the material in said closures during their movement between said second and third positions, a third rotary dial having a plurality of seats for supporting said closures, means at said third position for transferring successive closures from said second dial to said third dial, said third dial being arranged to carry said closures from said third position to a fourth discharge position, and means for applying a molding heat and pressure to the material in said closures during their movement between said third and fourth positions.

3. Apparatus of the character described in claim 2 wherein said first dial includes means for rotating said closures about their axes during their movement between said first and second positions.

4. Apparatus of the character described in claim 3 wherein said closure rotating means comprises a vertical spindle secured to each of said seats, each of said vertical spindles being journalled in said first dial and extending downwardly from its associated seat, a roller carried by each of said spindles, and endless belt means engageable with said rollers for rotating said spindles and hence the receptacles supported on said seats during a portion of each revolution of each dial.

5. Apparatus of the character described in claim 2 wherein means is provided for feeding empty closures to said first dial, said closure feeding means including means for heating said empty closures.

6. Apparatus of the character described in claim 2 wherein said means for applying molding heat and pressure includes a plunger device mounted on said third rotary dial above each of its seats for vertical reciprocation, each of said plunger devices comprising a plunger movable between a lowered operative position and a raised inoperative position, spring means normally urging said plunger into its operative position, cam follower means on said plunger engageable with stationary cam means for moving said plunger into its inoperative position, and latch means operatively associated with said plunger for maintaining the latter in its inoperative position, and wherein stationary means is provided for releasing said latch means to permit said plunger to move into its operative position under the influence of said spring means.

7. Apparatus of the character described in claim 2 wherein each of said depositing devices includes a member defining a cylindrical chamber carried by said first dial above each of said seats for vertical reciprocating movement, spring means urging each of said members toward its respective seat, means operable during the rotation of said dial to move each of said members away from its respective seat and to control the movement of each of said members toward its respective seat under the influence of said spring means, means for connecting the chamber of each of said members with said reservoir, a hollow piston reciprocably mounted within the chamber of each of said members, and means responsive to the presence of a receptacle on each seat operable to permit the associated hollow piston to reciprocate with respect to its member to thereby eject a charge into said receptacle.

8. An apparatus of the character described in claim 7 wherein said last-mentioned means includes fingers mounted for movement with said hollow pistons arranged to engage the receptacles on their respective seats.

9. An apparatus of the character described in claim 7 wherein said last-mentioned means includes locking elements normally biased into a position to prevent movement of said members toward said seats and movable by the presence of receptacles on said seats into a second position permitting movement of said members toward said seats.

10. An apparatus of the character described in claim 9 wherein said locking elements are moved into said second position by engagement of said receptacles therewith.

11. An apparatus of the character described in claim 10 wherein said locking elements are moved out of engagement with said receptacles by the movement of said members.

12. Apparatus of the character described in claim 2 wherein said first dial includes a first bore extending vertically therethrough above each of said seats and a second bore extending vertically therethrough in spaced relation to each of said first bores, and wherein each of said depositing devices includes a member slidable in one of said first bores, and means for moving said member during the rotation of said dial, said moving means comprising a spring pressed plunger slidably mounted in each of said second bores, a vertical slot communicating between respective first and second bores, a key element carried by each of said plungers and extending through the associated slot into the associated first bore, and groove means on each of said members for receiving the associated key element.

13. An apparatus of the character described in claim 12 wherein said groove means includes a first groove extending around at least a portion of the periphery of said member and a second groove extending longitudinally from said first groove to one end of said member.

14. Apparatus of the character described in claim 1, including means for heating the naked closures during their movement along said path prior to the depositing of a measured charge therein.

References Cited in the file of this patent

UNITED STATES PATENTS

| | | |
|---|---|---|
| 993,288 | Bartlett | May 23, 1911 |
| 1,053,898 | Bogdanffy | Feb. 18, 1913 |
| 1,073,067 | Ayars | Sept. 9, 1913 |
| 1,534,307 | De Palma | Apr. 21, 1925 |
| 1,861,589 | Warth | June 7, 1932 |
| 1,956,012 | Egan | Apr. 24, 1934 |
| 1,965,732 | Blisterfield | July 10, 1934 |
| 1,976,650 | Becker et al. | Oct. 9, 1934 |

(Other references on following page)

UNITED STATES PATENTS

| | | |
|---|---|---|
| 2,055,742 | Burke | Sept. 29, 1936 |
| 2,169,573 | Vogt | Aug. 15, 1939 |
| 2,224,653 | Lane et al. | Dec. 10, 1940 |
| 2,287,356 | Newman | June 23, 1942 |
| 2,327,228 | Umlandt | Aug. 16, 1943 |
| 2,516,908 | Pottle | Aug. 1, 1950 |
| 2,553,590 | Joswig | May 22, 1951 |
| 2,644,629 | Velie | July 7, 1953 |
| 2,654,343 | Burbank et al. | Oct. 6, 1953 |
| 2,657,426 | Gora | Nov. 3, 1953 |
| 2,663,909 | Maier et al. | Dec. 29, 1953 |
| 2,729,870 | Guttrie | Jan. 10, 1956 |
| 2,745,135 | Goza | May 15, 1956 |
| 2,840,858 | Ranier et al. | July 1, 1958 |
| 2,846,335 | Alholm et al. | Aug. 5, 1958 |